United States Patent [19]

Park et al.

[11] Patent Number: 5,448,399
[45] Date of Patent: Sep. 5, 1995

[54] OPTICAL SYSTEM FOR SCANNING MICROSCOPE

[75] Inventors: Sang-Il Park, Palo Alto; Frederick I. Linker, Menlo Park; Ian R. Smith, Los Gatos, all of Calif.

[73] Assignee: Park Scientific Instruments, Sunnyvale, Calif.

[21] Appl. No.: 850,677

[22] Filed: Mar. 13, 1992

[51] Int. Cl.[6] .................. G02B 21/18; G02B 21/00
[52] U.S. Cl. ................................. 359/372; 359/227; 359/368
[58] Field of Search .................. 359/368–390, 359/227, 234–236, 429, 894, 896; 351/205–208, 212, 216–218, 220, 221, 233–236, 243

[56] References Cited

U.S. PATENT DOCUMENTS

| 1,864,895 | 6/1932 | Zgy | 359/373 |
|---|---|---|---|
| 3,030,861 | 4/1962 | Mortimer et al. | 359/380 |
| 3,417,685 | 12/1968 | Kato et al. | 359/376 |
| 4,621,283 | 11/1986 | Feinbloom | 358/93 |
| 4,688,181 | 8/1987 | Cottrell et al. | 364/521 |
| 4,700,298 | 10/1987 | Palcic et al. | 364/414 |
| 4,714,327 | 12/1987 | Marshall | 359/393 |
| 4,762,996 | 8/1988 | Binning et al. | 250/306 |
| 4,806,755 | 2/1989 | Duerig et al. | 250/306 |
| 4,814,622 | 3/1989 | Gregory et al. | 250/306 |
| 4,871,938 | 10/1989 | Elings et al. | 310/328 |
| 4,874,979 | 10/1989 | Rapp | 310/328 |
| 4,907,287 | 3/1990 | Homma et al. | 382/54 |
| 4,908,519 | 3/1990 | Park et al. | 250/306 |
| 4,939,363 | 7/1990 | Bando et al. | 250/306 |
| 4,947,042 | 8/1990 | Nishioka et al. | 250/306 |
| 4,954,705 | 9/1990 | Brunner et al. | 250/310 |
| 4,980,922 | 12/1990 | Leib | 382/31 |
| 4,992,660 | 2/1991 | Kobayashi | 250/306 |
| 4,999,494 | 3/1991 | Elings | 205/306 |
| 5,001,697 | 3/1991 | Torres | 364/521 |
| 5,017,010 | 5/1991 | Mamin et al. | 356/345 |
| 5,025,658 | 6/1991 | Elings et al. | 73/105 |
| 5,051,379 | 9/1991 | Bayer et al. | 437/225 |
| 5,051,977 | 9/1991 | Goldberg | 369/126 |
| 5,061,074 | 10/1991 | Ohikata et al. | 359/376 |
| 5,066,858 | 11/1991 | Elings et al. | 250/307 |
| 5,077,473 | 12/1991 | Elings et al. | 250/306 |
| 5,083,022 | 1/1992 | Miyamoto et al. | 250/306 |
| 5,103,094 | 4/1992 | Hayes et al. | 250/306 |
| 5,107,113 | 4/1992 | Robinson | 250/306 |
| 5,117,110 | 5/1992 | Yasutake | 250/306 |
| 5,132,837 | 7/1992 | Kitajima | 359/368 |
| 5,144,128 | 9/1992 | Hasegawa et al. | 250/306 |
| 5,144,833 | 9/1992 | Amer et al. | 73/105 |
| 5,157,251 | 10/1992 | Albrecht et al. | 250/216 |
| 5,157,256 | 10/1992 | Aaron | 250/306 |
| 5,162,779 | 11/1992 | Lumelsky et al. | 340/709 |
| 5,166,516 | 11/1992 | Kajimura | 250/234 |
| 5,172,002 | 12/1992 | Marshall | 250/561 |
| 5,187,776 | 2/1993 | Yanker | 395/157 |
| 5,231,580 | 7/1993 | Cheung et al. | 364/413.13 |
| 5,253,106 | 10/1993 | Hazard | 359/368 |

FOREIGN PATENT DOCUMENTS

| 102607 | 6/1982 | Japan | 359/368 |
|---|---|---|---|
| 2-239562 | 9/1990 | Japan . | |

OTHER PUBLICATIONS

"Atomic and Molecular Manipulation with the Scanning Tunneling Microscope", Joseph A. Stroscio and D. M. Eigler, Nov. 1991, pp. 1319–1326.

*Primary Examiner*—Loha Ben
*Assistant Examiner*—Thong Nguyen
*Attorney, Agent, or Firm*—Skjerven, Morrill, MacPherson, Franklin & Friel; Norman R. Klivans; O. K. Suryadevara

[57] ABSTRACT

An optical system for a scanning probe microscope provides both an optical on-axis view and an optical oblique view of the sample by means of two optical paths each providing an image to a CCD camera via an auto-zoom lens. A shutter alternately blocks the image of either view from reaching the auto-zoom lens. The CCD camera provides the optical image to a video display which also displays the scanning probe image, thus eliminating the need for eyepieces and allowing easy viewing of both the optical and scanning probe images simultaneously.

8 Claims, 29 Drawing Sheets

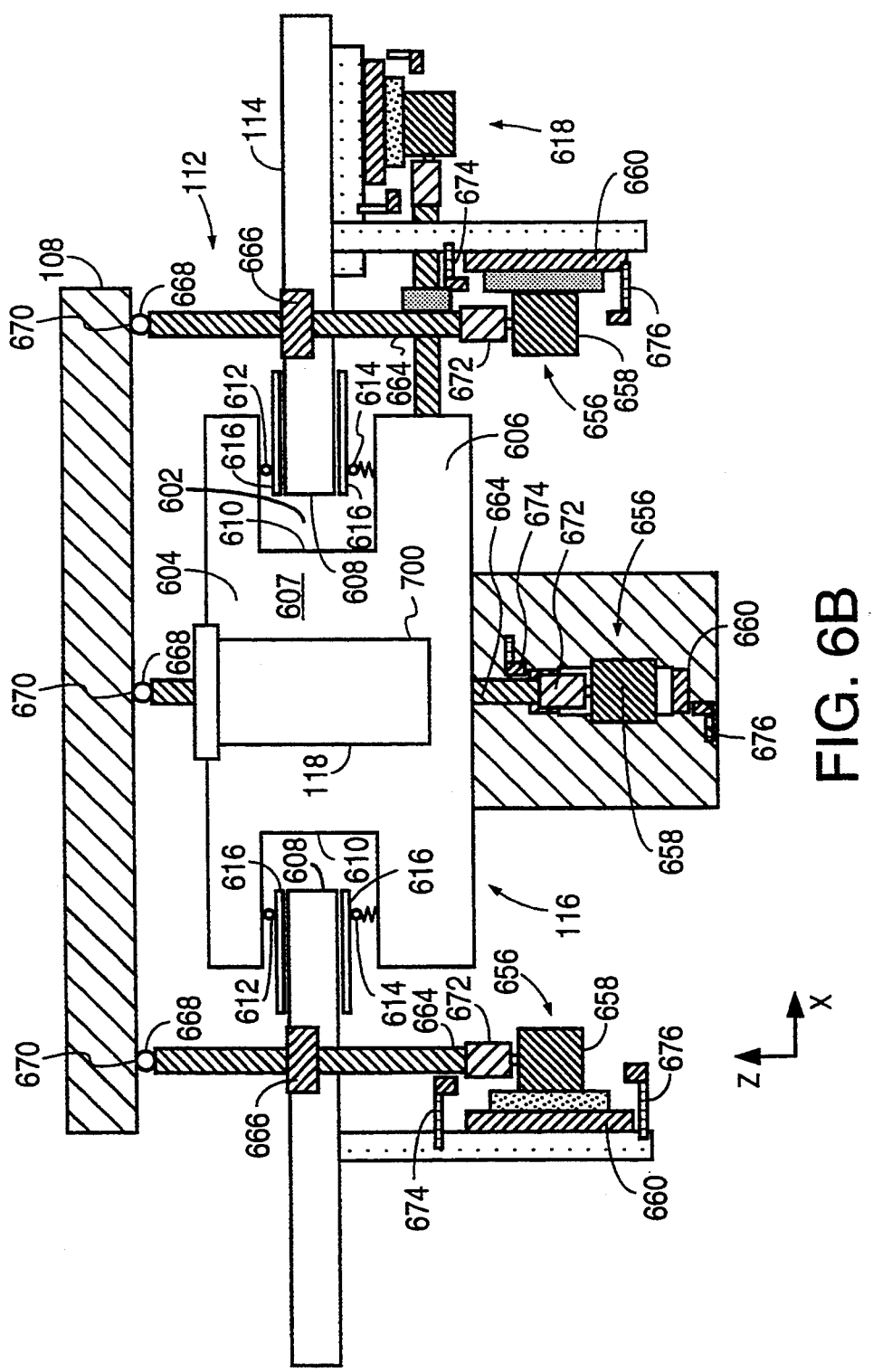

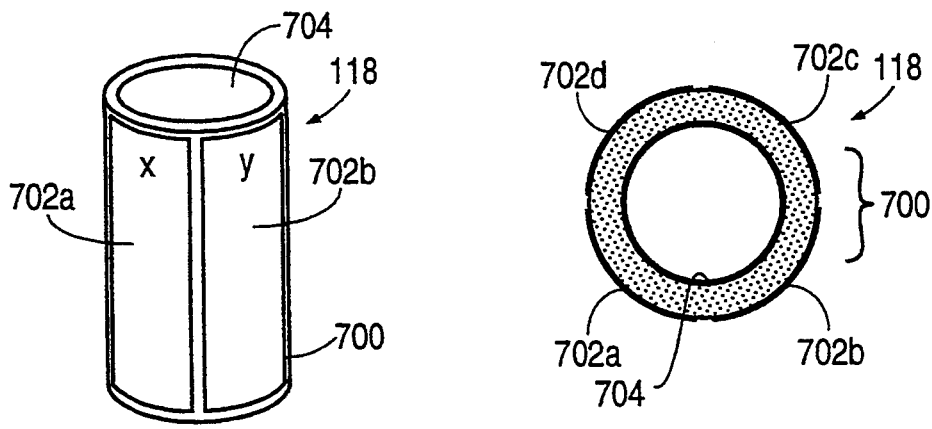
FIG. 7A
FIG. 7B
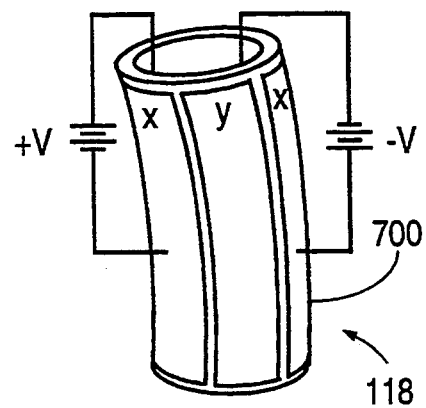
FIG. 7C

OPTICAL SYSTEM FOR SCANNING MICROSCOPE

FIELD OF THE INVENTION

This invention relates to scanning probe microscopes, which are used to obtain extremely detailed analyses of the topography and other characteristics of samples such as semiconductor devices and data storage media and, more particularly, to scanning probe microscopes which are classified as scanning force microscopes or scanning tunneling microscopes.

BACKGROUND OF THE INVENTION

Definitions

"Scanning probe microscope" (SPM) means an instrument which provides a microscopic analysis of the topographical features or other characteristics of a surface by causing a probe to scan the surface. It refers to a class of instruments which employ a technique of mapping the spatial distribution of a surface property, by localizing the influence of the property to a small probe. The probe moves relative to the sample and measures the change in the property or follows constant contours of the property. Depending on the type of SPM, the probe either contacts or rides slightly (up to a few hundred Angstroms) above the surface to be analyzed. Scanning probe microscopes include devices such as scanning force microscopes (SFMs), scanning tunneling microscopes (STMs), scanning acoustic microscopes, scanning capacitance microscopes, magnetic force microscopes, scanning thermal microscopes, scanning optical microscopes, and scanning ion-conductive microscopes.

"Probe" means the element of an SPM which rides on or over the surface of the sample and acts as the sensing point for surface interactions. In an SFM the probe includes a flexible cantilever and a microscopic tip which projects from an end of the cantilever. In an STM the probe includes a sharp metallic tip which is capable of sustaining a tunneling current with the surface of the sample. This current can be measured and maintained by means of sensitive actuators and amplifying electronics. In a combined SFM/STM the probe includes a cantilever and tip which are conductive, and the cantilever deflection and the tunneling current are measured simultaneously.

"Cantilever" means the portion of the probe of an SFM which deflects slightly in response to forces acting on the tip, allowing a deflection sensor to generate an error signal as the probe scans the surface of the sample.

"Tip" in an SFM means the microscopic projection from one end of the cantilever which rides on or slightly above the surface of the sample. In an STM, "tip" refers to the metallic tip.

"Package" means an assembly which includes the cantilever and tip, a chip from which the cantilever projects, and may include a plate on which the chip is mounted.

"Scanning Force Microscope" SFM (sometimes referred to as Atomic Force Microscope) means an SPM which senses the topography of a surface by detecting the deflection of a cantilever as the sample is scanned. An SFM may operate in a contacting mode, in which the tip of the probe is in contact with the sample surface, or a non-contacting mode, in which the tip is maintained at a spacing of about 50 Å or greater above the sample surface. The cantilever deflects in response to electrostatic, magnetic, van der Waals or other forces between the tip and surface. In these cases, the deflection of the cantilever from which the tip projects is measured.

"Scanning Tunneling Microscope" (STM) means an SPM in which a tunneling current flows between the probe and the sample surface, from which it is separated by approximately 1–10 Å. The magnitude of the tunneling current is highly sensitive to changes in the spacing between the probe and sample. STMs are normally operated in a constant current mode, wherein changes in the tunneling current are detected as an error signal. A feedback loop uses this signal to send a correction signal to a transducer element to adjust the spacing between the probe and sample and thereby maintain a constant tunneling current. An STM may also be operated in a constant height mode, wherein the probe is maintained at a constant height so that the probe-sample gap is not controlled, and variations in the tunneling current are detected.

"Kinematic mounting" means a technique of removably mounting a rigid object relative to another rigid object so as to yield a very accurate, reproducible positioning of the objects with respect to each other. The position of the first object is defined by six points of contact on the second. These six points must not over or under constrain the position of the first object. In one common form of kinematic mounting, three balls on the first object contact a conical depression, a slot (or groove) and a flat contact zone, respectively, on the second object. Alternatively, the three balls fit snugly within three slots formed at 120° angles to one another on the second object. The foregoing are only examples; numerous other kinematic mounting arrangements are possible. According to the principles of kinematic mounting, which are well known in the mechanical arts, six points of contact between the two objects are required to establish a kinematic mounting arrangement. For example, in the first illustration given above, the first ball makes contact at three points on the conical surface (because of inherent surface imperfections, a continuous contact around the cone will not occur), two points in the slot, and one point on the flat surface, giving it a total of six contact points. In the second illustration, each ball contacts points on either side of the slot into which it fits.

The Prior Art

Scanning probe microscopes (SPMs) are used to obtain extremely detailed analyses of the topographical or other features of a surface, with sensitivities extending down to the scale of individual atoms and molecules. Several components are common to practically all scanning probe microscopes. The essential component of the microscope is a tiny probe positioned in very close proximity to a sample surface and providing a measurement of its topography or some other physical parameter, with a resolution that is determined primarily by the shape of the tip and its proximity to the surface. In a scanning force microscope (SFM), the probe includes a tip which projects from the end of a cantilever. Typically, the tip is very sharp to achieve maximum lateral resolution by confining the force interaction to the end of the tip. A deflection sensor detects the deflection of the cantilever and generates a deflection signal, which is then compared with a desired or reference deflection signal. The reference signal is then subtracted from the deflection signal to obtain an error signal, which is delivered to a controller. There are several types of deflection sensors. One type uses an optical interferometer as described in an article by D. Rugar et al., *Review of Scientific Instruments*, Vol. 59, p. 2337 (1988). Most commercial SFMs, however, employ a laser beam which is reflected from the back of the cantilever and use a photodetector to sense the angular movement of the beam as the cantilever is deflected. The probe (cantilever and tip) and deflection sensor are normally housed in a unit referred to as a head, which also contains circuitry for preamplifying the signals generated by the deflection sensor before they are passed to a controller. An image is formed by scanning the sample with respect to the probe in a raster pattern, recording data at successive points in the scan, and displaying the data on a video display. The development of scanning (or atomic) force microscopy is described in articles by G. Binnig et al., *Europhys. Lett.*, Vol. 3, p. 1281 (1987), and T. R. Albrecht et al., *J. Vac. Sci. Technology*, A6, p. 271 (1988). The development of the cantilever for SFMs is described in an article by T. R. Albrecht et al., entitled "Microfabricated Cantilever Stylus for Atomic Force Microscopy". *J. Vac. Sci. Technol.*, A8, p. 3386 (1990). Other types of SPMs, such as scanning capacitance or scanning magnetic force microscopes, also use similar deflection sensors.

A scanning tunneling microscope (STM) is similar to an SFM in overall structure, but the probe consists of a sharpened conductive needle-like tip rather than a cantilever. The surface to be mapped must generally be conductive or semiconductive. The metallic needle is typically is positioned a few Angstroms above the surface. When a bias voltage is applied between the tip and the sample, a tunneling current flows between the tip and the surface. The tunneling current is exponentially sensitive to the spacing between the tip and the surface and thus provides a representation of the spacing. The variations in the tunneling current in an STM are therefore analogous to the deflection of the cantilever in an SFM. The head contains circuitry for biasing the tip with respect to the sample and preamplifying the tunneling current before it is passed to a controller.

Before a desired region on the sample can be analyzed in an SFM, it must be positioned properly with respect to the probe, that is, the probe must be positioned above the location on the sample to be examined and must be brought into contact or close proximity with the sample. This requires two types of movement: first a lateral (x,y) movement and then a vertical (z) movement. The translations required to do this are beyond the limited range of the x,y,z fine movement stage. This process may be accomplished manually or with "coarse" positioning stages. In the latter case, the sample or head is mounted on a coarse x,y stage, which is capable of horizontal movement in any direction to properly position the sample beneath the probe. Typically, a coarse x,y stage has a translation range of around 25 mm.

A coarse z stage is used to position the probe vertically with respect to the sample. It is desirable that a z coarse stage permit maximum sample-probe separation (e.g., 30 mm or more if possible). In this position, the probe can be changed if necessary and/or a different sample may be placed in the SPM. The coarse z stage is also adjustable to bring the probe to a distance (e.g., of around 100 $\mu$m) where the position relationship between the probe and sample can be viewed through an accessory optical microscope. The coarse x,y stage is then used to move the sample horizontally with respect to the probe until the optical microscopic view indicates that the probe is positioned over a feature or area of the sample which is to be analyzed. The coarse z stage is then adjusted carefully so as to bring the probe to the sample gradually until the scanner fine x,y,z stage (scanner, described below) and its associated feedback loop (described below) take over to maintain a proper probe-sample separation. The final approach requires a resolution of about one micron and must be performed delicately to avoid crashing the probe into the sample.

In all of the coarse and fine (scanning) movements, the key factor is the position and movement of the probe relative to the sample. The actual movement may be performed by the probe or the sample or both.

The scanning operation is performed by a fine x,y,z stage, or scanner, which has a range of about 1–300 $\mu$m in the x and y directions and about 1–15 $\mu$m in the z direction. The scanner typically moves the sample horizontally such that the probe follows a raster-type path over the surface to be analyzed. In the fast scan direction, a computer collects a line of data at a series of points. Movement in the slow scan direction positions the scanner for the next line of data points to be taken. The resulting image will be made up of individual pixels. Usually, all data are collected in the same fast scan direction, that is, data are not collected along the reverse path.

In most SPMs, the scanning movement is generated with a vertically-oriented piezoelectric tube. The base of the tube is fixed, while the other end, which may be connected to either the probe or the sample, is free to move laterally as an input voltage signal is applied to the piezoelectric tube. The use of a piezoelectric tube in this application is well known and is described, for example, in an article by Binnig and Smith, *Review of Scientific Instruments*, Vol. 57, pp. 1688 (August 1986).

Fine movement in the z direction is normally also obtained using a piezoelectric device. FIG. 11A illustrates the prior art feedback loop for controlling the movement of the scanner in the z direction. Assuming the device is an SFM or other device that uses a similar type of cantilever, a deflection sensor measures the deflection of the probe and generates an error signal E which is the difference between the deflection signal and a reference signal. The error signal E is passed to a controller which applies a z feedback voltage signal $Z_v$ which drives a scanner in the z direction so as to maintain a constant cantilever deflection as the sample is scanned horizontally. For example, if the probe encounters a bump in the sample surface, the feedback signal $Z_v$ will cause the scanner to increase the separation between the probe and the sample and thereby maintain a constant cantilever deflection. The feedback signal $Z_v$ thus represents the sample topography and can be used to form an image. Alternatively, the SFM may be operated with the feedback adjusted so as to compensate only for large topographical features such as sample slope, and the error signal E may be used to generate a representation of the sample surface. This mode has disadvantages. For example, damage to the surface or probe may occur if the probe deflection exceeds a maximum limit.

In the prior art the function of the controller may be achieved purely by analog circuitry, in which the error signal is appropriately processed in order to optimize the performance of the feedback loop. Alternatively, the error signal may be digitized, and the processing may be performed digitally using a computer or digital signal processing device, such as are commonly known and available. In the latter case, the digital signals are converted back into analog form before they are transmitted to the scanner.

The feedback loop in an STM operates in a very similar manner, the primary difference being that the error signal which is sent to the controller is generated by the tunneling current rather than the deflection of a cantilever. The difference of this current from a set value, which is a function of the spacing between the probe and the surface, is used by the controller to determine the z feedback signal which it sends to the scanner. The feedback signal adjusts the scanner position to maintain constant spacing between the probe and the surface. Since the tunneling current depends exponentially on the spacing between the probe and the surface, a high vertical sensitivity is obtained. Because the probe may be atomically sharp, the lateral sensitivity is also high.

The topography of the sample is often displayed in a format known as a grey scale, in which the image brightness at each pixel point is some function of the surface height at that point on the surface. For example, when the z feedback signal applied to the scanner causes it to pull the sample back (e.g., to compensate for the height of a peak on the surface) the corresponding data point on the display is painted bright. Conversely, when the sample is moved towards the probe (e.g., to compensate for the depth of a valley) the data point is painted dark. Each pixel on the display thus represents an x,y position on the sample and the z coordinate is represented by intensity. The z position can also be represented numerically or graphically with high precision.

As stated above, it is known to measure the deflection of the cantilever in an SFM by directing a laser beam against a smooth surface on the back of the cantilever and detecting changes in the position of the reflected laser beam as the cantilever is deflected. The shift in the laser beam position is normally detected by a bi-cell position-sensitive photodetector (PSPD). With conventional SFM's, this detection circuitry generally obstructs an optical view of the probe positioned over the sample. Application Ser. No. 07/668,886, (now U.S. Pat. No. 5,157,251), filed Mar. 13, 1991, which is incorporated herein by reference, describes a deflection sensor in which the laser beam is reflected from a mirror positioned to a side of the cantilever so that the view from directly above the cantilever is not obstructed. That application also describes a system for kinematically mounting the mirror in the deflection sensor and a mechanism for kinematically mounting the head on the base.

These represent significant improvements over the prior art. However, a number of difficulties remain with prior art scanning probe microscopes, including the following:

1. In an SFM, the probe normally wears out and must be replaced after several samples have been scanned. Moreover, it is often desirable to change probes between samples to avoid contaminating the surface of a new sample with material accumulated on the tip from a previous sample surface. With the type of deflection sensor described above, the laser beam must be precisely directed to a very small area, on the order of 20 microns wide, on the back of the cantilever. Each time the cantilever is replaced, the laser beam must be readjusted so that it strikes the same position. Aligning the deflection sensor is a time-consuming procedure and typically requires a very precise position stage. For example, scanning a sample might take 30 minutes, and repositioning the laser spot might take an additional 15 minutes. Thus, a large portion of the time spent on a sample must be used to realign the deflection sensor after the probe has been replaced.

2. Different preamplification circuitry is required to amplify either the signal from the deflection sensor in an SFM or the tunneling currents from the tip in an STM. These preamps must be located in the head, close to the source of their respective signals, to reduce noise pickup. Likewise, SFMs and STMs typically require different probes, also located in the head. In the prior art arrangements, a head is dedicated either to an SFM or to an STM. Consequently, the head must be disengaged and replaced in order to switch between SFM and STM operating modes. This is a time consuming procedure. Moreover, each head is an expensive component.

3. A bi-cell PSPD is typically used in the deflection sensor of an SFM to detect changes in light position caused by cantilever deflection. The sensitivity of bi-cells to these changes depends nonlinearly on the initial light position. Sensitivity is greatest when the light strikes the center of the PSPD, thereby producing a zero initial signal. As the light position moves off-center (i.e., an initial signal offset is present), sensitivity drops. If the initial offset is too large, the bi-cell cannot function, since light strikes only one of the cells. This nonlinear position response is further adversely affected by intensity variations across the width of the light spot. To minimize these effects, frequent and time-consuming adjustments to zero the initial signal offset are necessary before running the microscope and each time a probe is changed.

4. The coarse x,y stage in an SPM is often a stacked structure which has at least three levels: a fixed base, a y stage, and an x stage. This configuration has a relatively large mechanical loop, i.e., thermal and mechanical displacements in these individual stages are cumulative and can affect the spacing between the probe and sample. These displacements are a significant source of noise in the data. A configuration with a large mechanical loop may also be unstable.

5. Piezoelectric scanners inherently exhibit nonlinear behavior which includes hysteresis (where the scanner position for a given control voltage is a function of past history of movement), creep (where the scanner position gradually drifts in response to an applied voltage), and nonlinear response (where the scanner position is a nonlinear function of applied voltage). In addition, bending of a piezoelectric tube scanner is inherently associated with its lateral movement and causes it to tilt. These nonlinear effects contribute undesirably to the data image and require some means for scan correction. U.S. Pat. No. 5,051,646 describes a method to correct for these nonlinearities by applying a nonlinear control voltage to the piezoelectric scanner. However, this method is "open loop", i.e., it does not use feedback and has no means to determine and correct the actual scanner motion due to the applied nonlinear input signal. Application Ser.

No. 07/766,656, now U.S. Pat. No. 5,210,410, filed Sep. 26, 1991, which is incorporated herein by reference, describes a method of correcting for nonlinearities in the x,y lateral motion of the scanner that is "closed loop", i.e., it does use feedback However, the method does not take into account the bending of a piezoelectric tube scanner, which causes tilt.

6. In typical SPMs the problem of hysteresis requires that each line of data in the raster scan be collected in the same direction, since data collected in the reverse direction includes the effects of hysteresis. As a consequence, each line of the raster scan must be traversed twice—once to collect data and once to return along the same path (or vice versa). The length of time necessary to generate an image is thus significantly greater than what it might be without hysteresis effects. Moreover, hysteresis problems prevent the use of data collected in the forward scan of a line to adjust the scan parameters before generating an image from scanning the line in the reverse direction.

7. Another source of error in the data image arises due to the thickness of the sample. As a piezoelectric tube scanner bends to thereby produce a lateral motion of a sample (or probe) mounted on it, the sample (or probe) moves in an arc-shaped path. As the thickness (vertical dimension) of the sample increases, a given input signal to the piezoelectric tube scanner therefore produces a larger horizontal translation of the surface of the sample.

8. In order to position the sample relative to the probe, it is useful to have both a coaxial (on-axis) and oblique view of the same using an optical microscope. These views provide means to monitor fine positioning of the sample relative to the probe. The coaxial view assists in positioning the probe over the feature of the sample to be measured. The oblique view permits accurate adjustment of probe orientation (for instance, cantilever tilt) relative to the sample surface. Conventional SPMs provide both these features; however, they are provided in two separate, manually operated microscopes, which are unwieldy to use. Obtaining these dual views is thus inconvenient.

9. In prior art SPMs the piezoelectric tube scanner cannot be operated at a rate greater than its resonant frequency. Above its resonant frequency, the response of the scanner to an input voltage signal is greatly reduced and out of phase with the input signal.

10. Prior art SPMs do not permit the adjustment of scanning parameters such as scanning rate or probe path in response to topographical features encountered by the probe.

SUMMARY OF THE INVENTION

In the scanning probe microscope of this invention, a package, which contains a probe, is kinematically mounted onto a cartridge, which in turn is kinematically mounted in the head. In order to switch probes, the cartridge is removed from the head and a new package, containing a new probe, is mounted onto the cartridge, which is then remounted in the head. The cartridge and package are thus both easily removed and replaced. The kinematic mounting techniques used ensure that the probe is positioned in the head within an accuracy of approximately 20 microns. This arrangement permits SFM and STM probes, and other types of probes, to be easily interchanged. Time-consuming adjustment to position the deflection sensor in an SFM is not required after probe replacement, as it is in the prior art.

The SFM probe consists of a flexible cantilever which projects from one end of a microfabricated chip. The chip is attached to a plate to form the package. This package also contains precisely aligned kinematic mounting points for securing it to the cartridge. The chip may be attached to the plate using integrated circuit (IC) mounting techniques, a gluing process, or other methods. Alternatively, a combined, integrated plate and chip can be microfabricated, and precisely aligned kinematic mounting points can be formed on it using lithographic means (for instance) to allow the package to be kinematically mounted on the cartridge. A chip or a package containing a chip may also be kinematically mounted directly in the head, thereby omitting the cartridge, or a chip may be kinematically mounted directly on the cartridge.

The deflection sensor of this invention uses a light beam deflection sensor to detect the angular movement of the light beam that occurs when the cantilever deflects. A linear position-sensitive photodetector (PSPD), i.e., an analog PSPD that can provide continuous linear information about the position of a light spot on the detector's active surface, is used to detect this movement instead of a bi-cell PSPD. A linear PSPD has a highly linear, continuous response to the position of the incident light beam and is much more tolerant of an initial offset in light position. Frequent adjustments of the PSPD to zero the initial offset are no longer necessary as they are in the prior art. Since occasional adjustments may be necessary to center the light on the PSPD to minimize noise, a position adjustment mechanism for the linear PSPD is provided.

The head of the scanning probe microscope contains circuitry capable of preamplifying both SFM and STM signals, thereby eliminating the need for two different heads which must be switched when shifting between scanning force and scanning tunneling microscopy.

A single, non-stacked coarse x,y stage holds both the sample and scanner. The coarse x,y stage is slidably clamped to the base and is loaded against it at three contact points. It is normally held stationary by friction between the clamping surfaces and the base. When the position of the coarse x,y stage is adjusted, the three contact points slide across a smooth surface on the base, which may preferably be glass microscope slides. Horizontal translation of the coarse x,y stage is accomplished by two adjustment members which are oriented perpendicularly to one another. In a preferred embodiment, each adjustment member is a screw which is threaded through a fixed nut and driven by a stepper motor. An end of one screw is ball-tipped and makes a single point of contact with an edge of the coarse x,y stage. An end of the other screw makes contact with a pushing plate, which in turn makes two points of contact with another edge of the x,y coarse stage. The pushing plate slides on a rail mounted on the underside of the base. The x,y stage and pushing plate are biased against their respective contact points by loading springs. The configuration of six contact points which define the position relative to the base of the coarse x,y stage (three clamping points, two pushing plate points, one screw end) constitute a stable kinematic mount. The x and y stepper motors slide along respective rails as the screws are advanced and withdrawn. The fixed nuts represent reference points which are positioned so as to minimize the mechanical loop involved in positioning the coarse x,y stage. There are alternative means of kinematically mounting a single non-stacked coarse x,y stage to the base so as to minimize the mechanical loop of the configuration which will become apparent in what follows.

The coarse z stage comprises three adjustment members which are arranged in a triangular configuration and regulate the separation between the head and the coarse x,y stage. In a preferred embodiment, each adjustment member comprises a screw which is oriented vertically and threaded through a fixed nut in the base of the microscope. Each screw is driven by a stepper motor which slides along a rail as the screw is advanced or withdrawn. Each screw is ball-tipped, and the head is mounted kinematically on the three screws. This configuration allows both the elevation and tilt of the probe with respect to the sample to be adjusted.

The scanner (also referred to as the fine x,y,z stage) comprises a piezoelectric tube whose base is fixed to the coarse x,y stage and whose opposite end is free to move in response to an applied voltage. A quad-cell PSPD is mounted axially at the upper end of the piezoelectric tube and faces a light source (e.g., a light emitting diode (LED)) mounted at the base of the tube. As the upper end of the piezoelectric tube moves horizontally, the position of the light striking the quad-cell PSPD shifts. The quad-cell PSPD thus senses the x,y movement of the free end of the piezoelectric tube and thereby of a sample mounted on it. In addition, two bi-cell PSPDs are mounted on the outer surface of the piezoelectric tube such that they face two light sources (for example LEDs). The outputs from these PSPDs are added together to provide a z position signal which is insensitive to sample tilt (which occurs due to bending of the piezoelectric tube as described above). The signals from the axially-mounted PSPD and the twin surface-mounted PSPDs are used in closed feedback loops to correct for the nonlinear behavior of the tube scanner.

Each of the stepper motors in the coarse z stage trips a limit switch when it reaches a maximum vertical position. The limit switches are positioned so that the head is oriented horizontally relative to the base when all three limit switches are tripped. With all three limit switches tripped, i.e., with the probe raised to its maximum height above the sample, the thickness of the sample can be measured by then causing the stepper motors to retract the screws until the probe makes contact with the sample and recording the distance traversed. Measurement of the sample height is used to correct for the horizontal scanning error which arises due to the finite sample thickness. As noted above, this error results from the bending of the piezoelectric tube scanner as its free end, holding the sample, is displaced laterally in response to the input voltage. The measurement is used to adjust the x,y sensitivity of the piezoelectric tube scanner, which is expressed as a unit of scanner displacement per unit of applied bias (e.g., $\mu m/volts$). Stepper motors are not required; any sufficiently well-calibrated and reproducible motor will suffice.

The sample thickness needs to be compared to that of a calibrating sample of the system (or reference surface). The reference surface is used to generate a value of the tube's lateral sensitivity ($\mu m/V$). The thickness of the calibrating sample (or reference height) is stored as the distance (or steps of the stepper motor) the z approach screws travel from the limit switches to the calibration sample or reference surface. An arbitrary sample's thickness is measured relative to this calibration. A change in the sample thickness affects the calibration values of the scanner through a simple formula as described below. In this manner the sample thickness is measured and the sensitivity of the scanner is updated.

A combined on-axis optical view and an oblique optical view of the sample positioned relative to the probe are provided. Either of these optical paths is selected by positioning a motorized shutter under computer control. The dual optical views obtained using a motorized shutter, mirrors, and lenses and the means of switching between them advantageously eliminates the need for two separate optical microscopes. Also, the microscope lenses positioned in the two optical paths (which can be either objective or achromat, for instance) are moved under motor control to raise or lower the focal plane and thus focus the image under computer control.

The system includes a scanning probe microscope (SPM) graphical user interface which has a simultaneous on-screen optical view and SPM view for user reference. These views are also used to locate and define regions graphically for the next scan. The image from either of the two optical paths is focussed on a conventional CCD camera by a computer controlled motorized zoom lens. The motorized zoom motor encoder allows automatic control of optical image magnification and optical image size. Calibration of the motorized zoom lens assembly permits accurate correlation of features in optical and SPM images. This eliminates the need for eyepieces for the optical microscope by displaying images on a video screen. Additionally, since the optical system is parfocal, the image magnification can be varied either by switching objective lenses (mounted on a conventional turret) or adjusting the motorized zoom lens and the image will remain focussed.

On-screen views (both optical and SPM) are coupled to sample movement relative to the probe. Computerized motors (x,y, and z) and/or the scanner automatically position the sample in a scan region chosen by graphical means. A desired scan region on the sample can be chosen by graphically highlighting a portion of an optical image or an SPM image. Automatic positioning of the SPM can then be used to successively narrow the scan width and zoom in on a feature of interest. Thus manual adjustments to position for the next scan are no longer needed as they aren't the prior art. The system places scan marks in the optical image to indicate SPM scan location, thereby creating a scan record. Features in the optical image and the SPM image can be accurately correlated.

The SPM of this invention uses an optical control process to automatically and quickly position the probe to within a few microns of the sample surface, by presetting the focal plane of the objective lens a few microns below the probe tip and then bringing this focal plane into coincidence with the sample. The three z stage motors and the motor coupled to the optical lens assembly are lowered in unison, moving the probe tip and the focal plane of the objective lens quickly down towards the sample, until software determines that the image of the sample surface is in focus. The z stage then slows down for final approach. This shortens the time required to bring the probe into proximity or contact with the surface, or to within the range of the fine x, y, z stage (the scanner).

This system also uses an optical control process to determine the tilt of a sample secured to a sample mount by bringing three different points on the surface into focus successively and determining the slope of the sample surface from this data. The sample slope is used for automatically adjusting the tilt of the head (and thereby the probe) so as to make it parallel to the sample surface. This tilt information can also be used to adjust scanning parameters or image display parameters that will remove this overall slope from images of the surface. Thus, this process can determine sample slope and probe tilt. (This slope can be due, for instance, to a crooked sample mount.)

Data image buffers in the user interface of the system are used to automatically transfer data between data acquisition and image processing modes, thus conserving permanent storage space. Buffers are displayed on-screen for visual reference and can be brought into an active window for image processing. The buffers can include data collected in real-time or data brought in from a database. Porting the buffered images automatically between the data acquisition and image processing modes gives the user much greater flexibility to analyze data in real-time, to quickly extract quantitative information, and to do image processing to determine if it will be worth saving permanently.

The user interface of this system provides a fast one-dimensional FFT (Fast Fourier Transform) performed on a live line trace of the data (i.e., a digital oscilloscope). Providing a live one-dimensional FFT allows the user to extract quantitative information without importing the image to an analysis program. Furthermore, the ability of the controller to perform FFT or other analyses on line data in real time allows the controller to use the results of the analysis to optimize the present scanning and feedback parameters of the SPM system. More generally, the system analytically detects undesirable outputs such as a mechanical resonance in the scanning data and then changes the scanning parameters (such as speed) so as to avoid exiting the resonance.

In another application of the ability to perform a one-dimensional FFT in real time, the user can display the live line trace and its one-dimensional FFT, and can also display the logarithm of the error signal. The latter is a useful capability in STM, where the signal (tunneling current) depends exponentially on the spacing between the tip and the sample. The user interface can perform the one-dimensional FFT on an arbitrary line of the data image, including an image retrieved from a database, using high and low pass filters which are graphically applied to the line using standard graphical user interface features such as cursors. The resultant filtered line is displayed in real time.

The interface of this system also provides a two-dimensional FFT and applies high and low pass filters to a reduced region of the sample for increased processing speed before applying the FFT to the entire data image. The use of, for instance, cursors to adjust filtering parameters and the display in real time of the calculation result makes using the variable band pass filter very intuitive and easy.

The interface of this system also facilitates optimization of parameters for 3-dimensional rendering of the data image. This rendering is the manner of displaying 3-dimensional data in the form that gives the illusion of depth, slope, shading, etc. on a computer screen. It uses a graphic to show the effect in real time of varying parameters for 3-dimensional rendering. Optimized parameters are then applied to the data image. This significantly shortens the iteration process required to achieve optimal 3-dimensional rendering. Any graphic can be used for this purpose, such as an artificial structure having simple geometries or a reduced data set such as data from some fraction of the image data to be processed.

DESCRIPTION OF THE DRAWINGS

FIGS. 6A, 6B and 6C illustrate top, side and bottom views, respectively, of the x,y and the z coarse movement stages.

FIGS. 7A and 7B illustrate perspective and top views, respectively, of a piezoelectric tube scanner. FIG. 7C illustrates schematically the deformation of the piezoelectric tube scanner upon the application of an input voltage.

FIGS. 16–8 illustrate the data analysis user interface.

DESCRIPTION OF THE INVENTION

Figure 1:
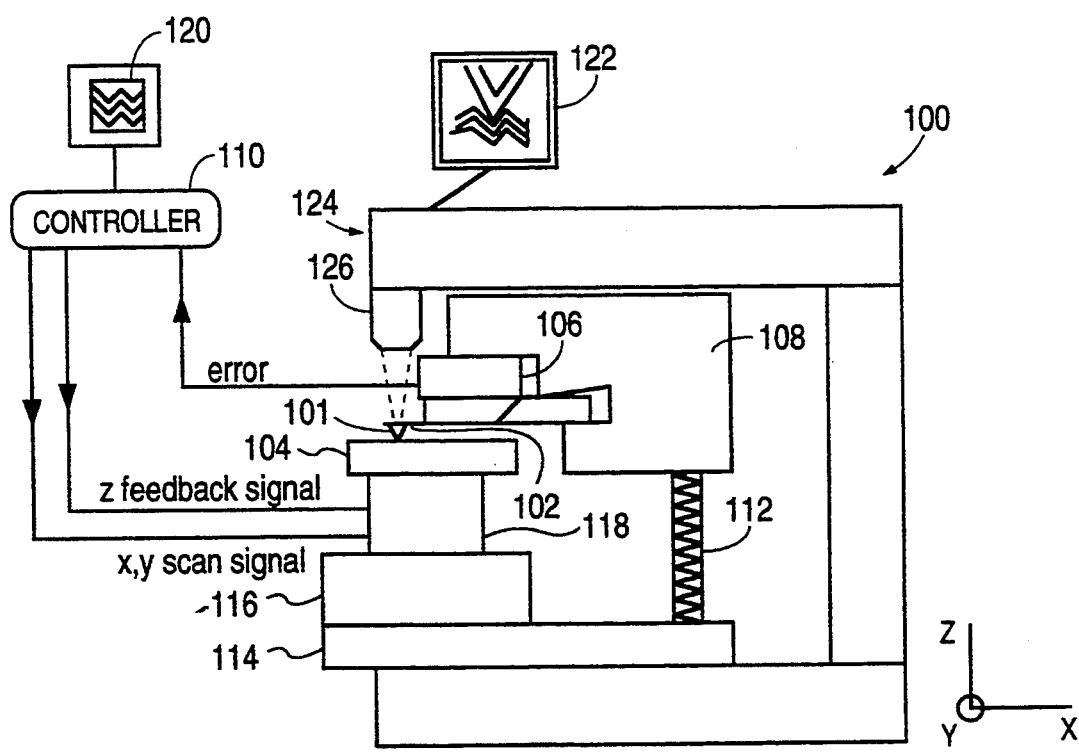
FIG. 1 illustrates a general schematic view of an SFM in accordance with a preferred embodiment of the invention.

A general schematic view of a scanning force microscope (SFM) 100 in accordance with the invention is shown in FIG. 1. A cantilever 102 from which a tip 101 projects is positioned over a sample 104. A deflection sensor 106, located in a head 108, detects the deflection of cantilever 102 as it scans the surface of sample 104, and sends an error signal to a controller 110. Cantilever 102 and tip 101, also referred to herein as a probe, are also located in the head. Cantilever 102 approaches sample 104 by means of a z coarse stage 112, which links head 108 to a base 114. Situated on base 114 is an x,y coarse stage 116 which positions the sample horizontally at the proper position below cantilever 102. A scanner (x,y,z fine stage) 118 is mounted in x,y coarse stage 116 and supports sample 104. Controller 110 generates an x,y scan signal which actuates scanner 118 to move sample 104 in a specified scanning pattern under cantilever 102. Controller 110 also uses the error signal provided by deflection sensor 106 to generate a z feedback signal which causes scanner 118 to alter the vertical position of sample 104 so as to maintain a constant deflection of cantilever 102. This z feedback signal is the output of scanning force microscope 100 and may be used to generate an SPM image 120. Alternatively, the image may be generated by using the error signal from deflection sensor 106. Other ways of generating an image in accordance with an aspect of this invention are described below.

In scanning force microscope 100, z coarse stage 112 and x,y coarse stage 116 are used to position cantilever 102 above a selected portion of sample 104. Scanner 118 provides the scanning function and maintains a selected deflection of cantilever 102 during a scanning cycle. Thus, z coarse stage 112 has a vertical range of approximately 25 mm, and x,y coarse stage 116 has a horizontal range of approximately 25 mm, while scanner 118 has horizontal and vertical translation ranges of around 100 $\mu$m and around 10 $\mu$m, respectively.

An optical view 122 of both the cantilever 102 and a portion of sample 104 is provided by an optical viewing assembly 124, which includes an objective lens 126. Optical viewing assembly 124 provides combined coaxial and oblique angle magnified views of cantilever 102 and sample 104.

The various components and modes of operation including the user interface of SFM 100 will now be described in greater detail, starting with a mechanism for mounting cantilever 102 in head 108, and continuing with the structures of deflection sensor 106, z coarse stage 112, x,y coarse stage 116, scanner 118 and optical viewing assembly 124.

Head Structure

Figure 2A:
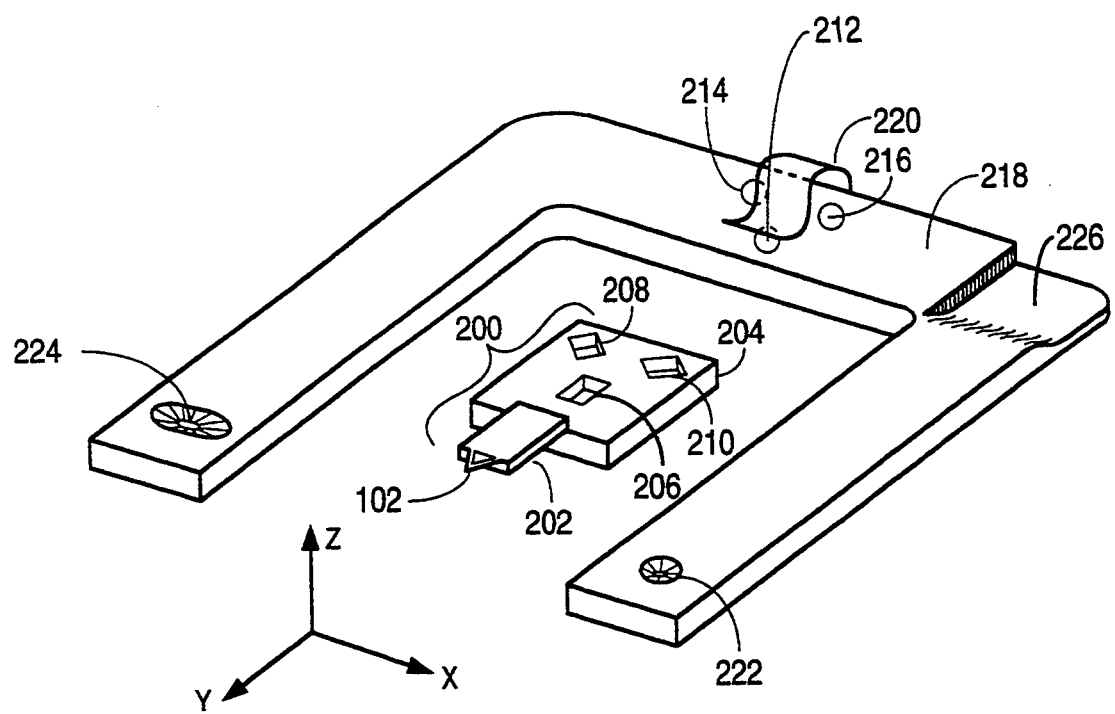
FIG. 2A illustrates a perspective view of a cantilever chip package and a cartridge to be mounted in an SFM.

As shown in FIG. 2A, which is a bottom view, cantilever 102 projects outward from one end of a chip 202, which may be microfabricated from silicon. Chip 202 is secured to an alumina plate 204 using glue and standard IC mounting techniques or other alignment methods. Alternatively, the plate may be made of some other material. Chip 202 and plate 204 together constitute a package 200, Plate 204 has three rectangular slots 206, 208 and 210 which are precisely laser-machined in alumina plate 204 and are oriented at an angle of 120° to each other. Slots 206, 208 and 210 form kinematic mounting points for package 200, and they fit accurately over balls 212, 214 and 216 which are attached to a U-shaped cantilever cartridge 218. A spring clip 220 ensures that package 200 is held securely against cantilever cartridge 218, with balls 212, 214 and 216 positioned in slots 206, 208 and 210, respectively. Spring clip 220 also allows package 200 to be removed and replaced easily from cantilever cartridge 218.

Figure 3:
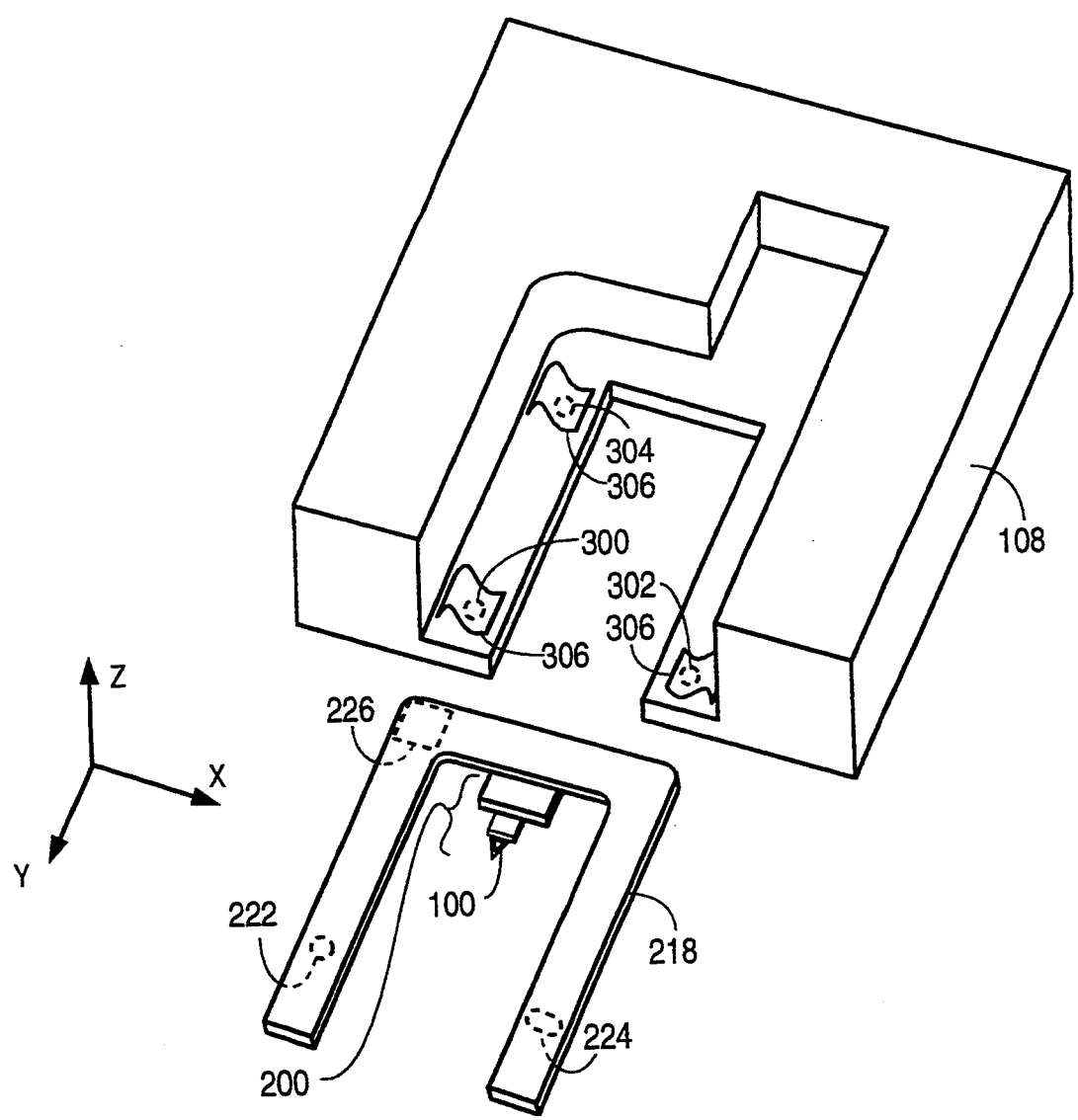
FIG. 3 illustrates a perspective view showing how the cartridge is mounted in the head.

Formed in cantilever cartridge 218 are a cone 222, a slot 224 and a flat 226 which serve as kinematic contacts for mounting it in head 108. Cone 222 and slot 224 are located on the respective arms of U-shaped cantilever cartridge 218 while flat 226 is located near the middle section of cantilever cartridge 218. As illustrated in FIG. 3, cone 222, slot 224 and flat 226 are positioned so that they coincide with three balls 300, 302 and 304 in head 108. Ball 300 fits in cone 222, ball 302 fits in slot 224, and ball 304 contacts flat 226, thereby providing a kinematic mount between cantilever cartridge 218 and head 108. Spring clips 306 hold cartridge 218 securely in place in head 108. As mentioned earlier, various other kinematic mounting techniques may also be used for mounting package 200 on cartridge 218 and for mounting cartridge 218 in head 108.

Figure 2B:
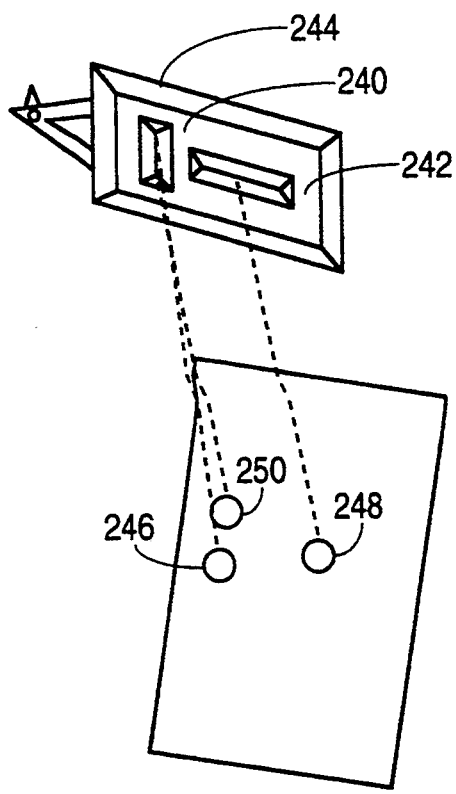
FIG. 2B illustrates a kinematically-mounted chip.

Alternatively, kinematic mounting means may be used to mount a probe-containing package directly in the head, thereby omitting the removable cartridge. Moreover, as shown in FIG. 2B, kinematic alignment trenches can be machined or lithographically formed in the chip itself. Such a structure is illustrated in FIG. 2B, which shows a chip 244 having trenches 240 and 242 formed in it which fit over balls 246, 248 and 250. Balls 246, 248 and 250 may be formed in a cartridge or in the head itself. When balls 246, 248 and 250 are fitted into trenches 240 and 242, a kinematic mount is formed. Other types of kinematic mounts may also be used.

Figure 4A:
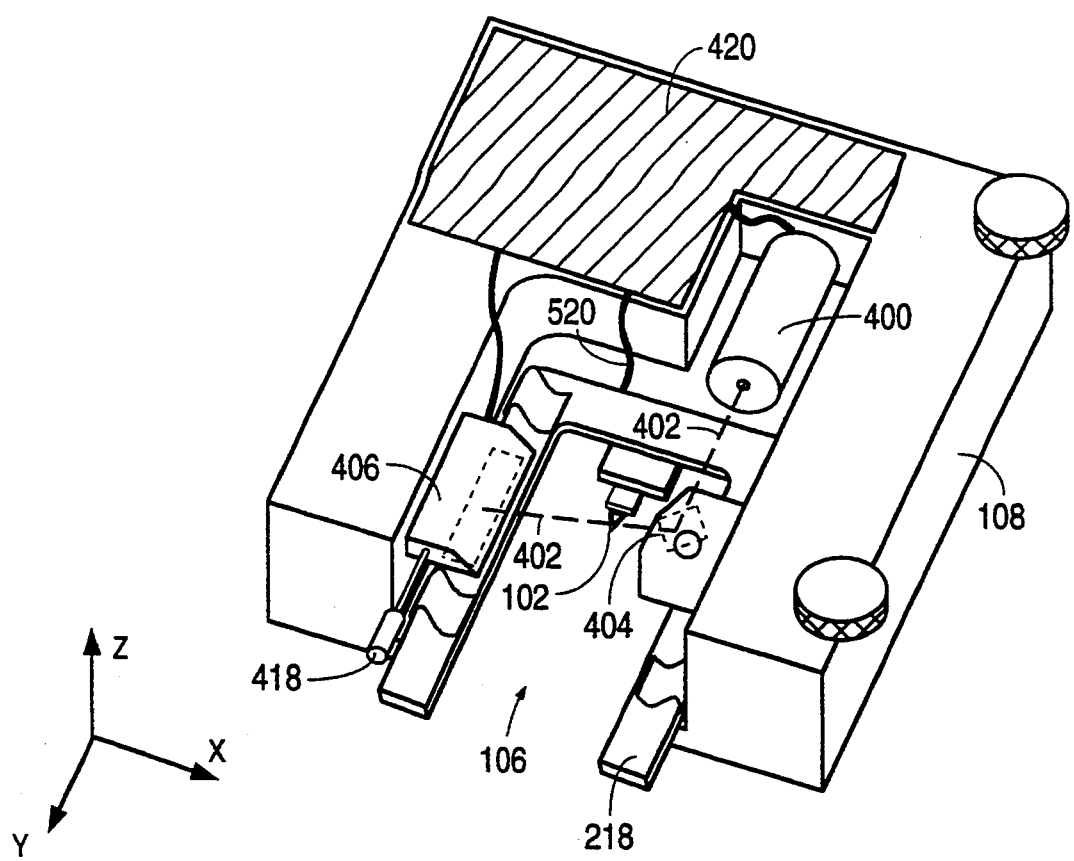
FIG. 4A illustrates a perspective view of the head, showing in particular the deflection sensor.

FIG. 4A illustrates a perspective view of head 108 showing the positioning of cantilever cartridge 218 with respect to deflection sensor 106. A laser diode 400 produces a focused laser beam 402 having a focus diameter or spot size of approximately 25 $\mu$m which is directed towards an alignment mirror 404 from which it is reflected to a selected area on the back of cantilever 102. Laser beam 402 is then reflected off the back of cantilever 102 and strikes a linear position-sensitive photodetector (PSPD) 406. PSPD 406 may be adjusted with respect to laser beam 402 by means of an adjustment screw 418. The output of PSPD 406 is sent to a preamplifier 420, which amplifies the signal and sends it to controller 110 (FIG. 1 ).

Figure 4B:
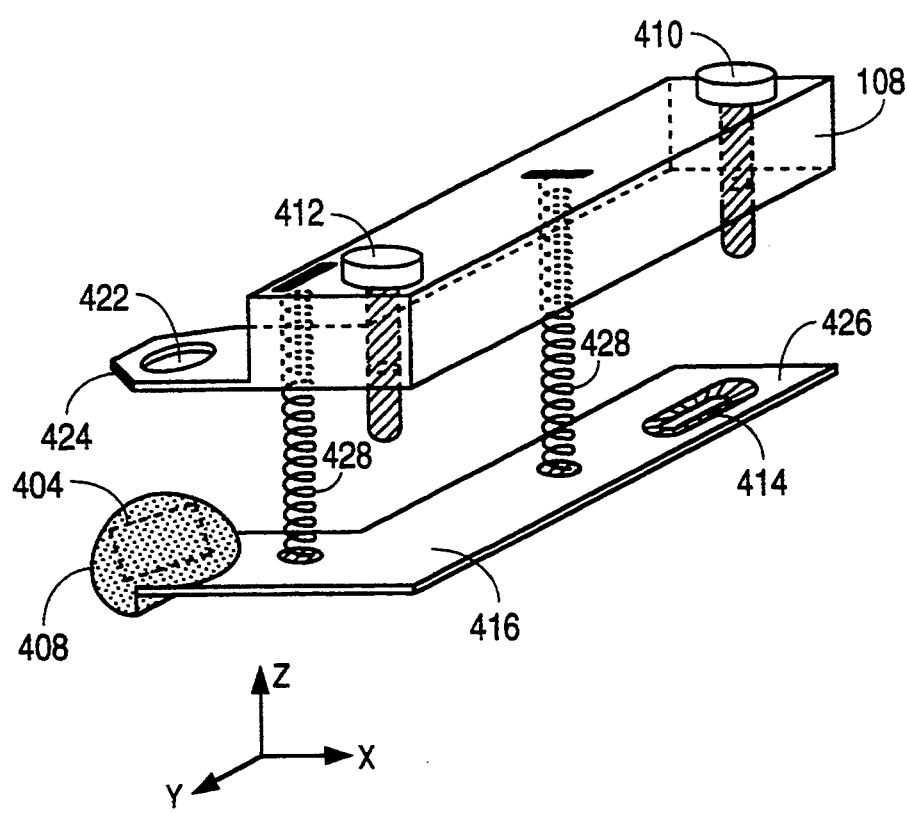
FIG. 4B illustrates a perspective view of the mounting mechanism for the laser alignment mirror in the deflection sensor.

FIG. 4B illustrates an expanded view of the kinematic mounting of alignment mirror 404 in head 108. Alignment mirror 404 is positioned at the center of a sphere 408, with a portion of sphere 408 being cut away to allow laser beam 402 to be reflected from mirror 404 (see FIG. 4A). The top surface of sphere 408 engages a circular hole 422 in mirror bracket 424, which is attached to head 108. Mirror adjustment screws 410 and 412 are threaded in tapped holes in head 108, and the ends of screws 410 and 412 contact a slot 414 and a flat 416, respectively, that are formed in adjustment member 426 which extends from sphere 408. Springs 428 bias sphere 408 against hole 422, and the tips of screws 410 and 412 against slot 414 and flat 416, respectively. Alignment mirror 404 is thus kinematically mounted in head 108, and the angular orientation of mirror 404 can be adjusted by turning screws 410 and 412.

This is a variation of an arrangement for mounting an alignment mirror kinematically in a head as described in application Ser. No. 07/668,886, filed Mar. 13, 1991. The arrangement of components of the deflection sensor has here been altered to permit closer approach of objective lens.

Referring again to FIG. 2, slots 206, 208 and 210 allow package 200 to be positioned on cantilever cartridge 218 to an accuracy of one micron; similarly, cone 222, slot 224 and flat 226 allow cantilever cartridge 218 to be positioned in head 108 to an accuracy of one micron. The IC techniques used to mount chip 202 on plate 204 assure an accuracy of approximately 20 microns or better. Accordingly, cantilever cartridge 218 can be removed from head 108, and package 200 can be replaced and cantilever cartridge 218 reinstalled in head 108 with an assurance that the new cantilever will be positioned to within approximately 20 microns of the position of the replaced cantilever. If the same package is replaced, this margin of error is reduced to about two microns. Since laser beam 402 must strike an area about 20 microns wide at the end of cantilever 102, this method of replacing cantilevers minimizes the need for adjustments to alignment mirror 404 or PSPD 406 when the cantilever is replaced between scanning operations. The laser beam realignment process with conventional scanning force microscopes, typically required each time a probe is replaced, is time-consuming. As noted above, the mounting arrangement of this invention can result in a savings of as much as one-third of the time necessary to perform a series of scans.

Figure 5A:
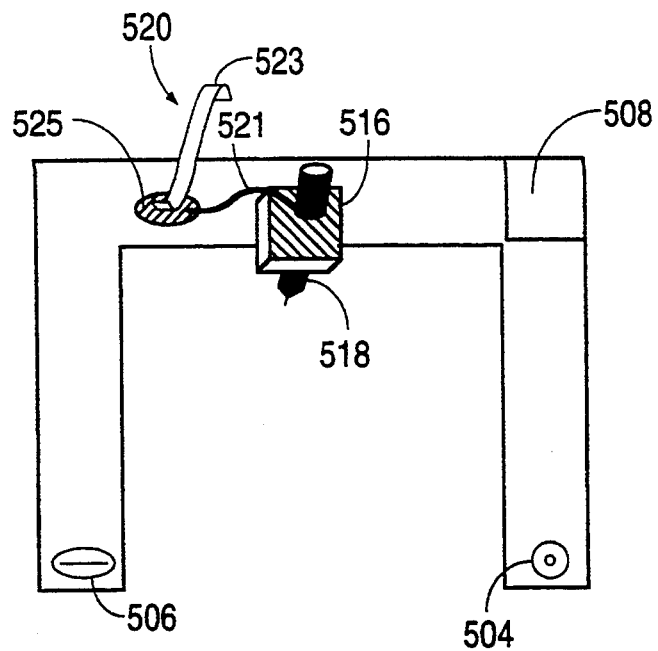
FIGS. 5A and 5B illustrate cartridges for an STM and a combined SFM/STM, respectively.
Figure 5B:
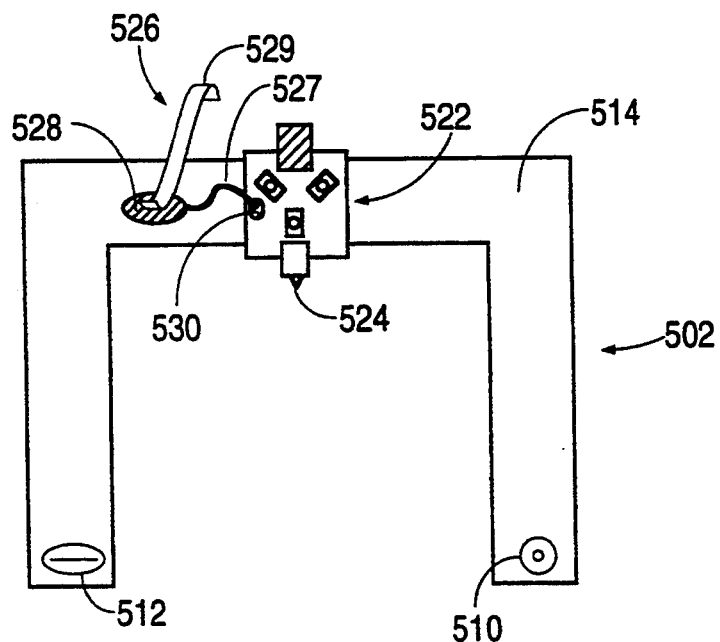

FIGS. 5A and 5B illustrate, respectively, a cartridge 500 for an STM probe and a cartridge 502 for a combined SFM/STM probe. Cartridges 500 and 502 are mounted in head 108 using kinematic mounts similar to those in cantilever cartridge 218. STM probe cartridge 500 contains a cone 504, a slot 506 and a flat 508. SFM/STM probe cartridge 502 contains a cone 510, a slot 512 and a flat 514. These elements function in exactly the same way as cone 222, slot 224 and flat 226 in cantilever cartridge 218. Cartridge 500 holds an STM package 516, which includes a metallic tip 518. Since STM package 516 provides a signal representative of the tunneling current at metallic tip 518, a conductive path 520 is provided for connecting STM package 516 to preamplifier 420. (The position of conductive path 520 in head 108 is illustrated in FIG. 4A.)

Cartridge 502 holds an SFM/STM package 522, from which a conductive cantilever 524 projects. A conductive path 526 for delivering the STM signal to preamplifier 420 is also provided. It will be understood that the output signal from STM package 516 is directed through conductive path 520, and no laser beam or PSPD are required. In the case of combined SFM/STM package 522, however, output signals flow both through conductive path 526 and from a PSPD (not shown in FIG. 5B) to provide simultaneous SFM and STM readings. Thus, one can use SFM/STM package 522 to measure cantilever deflection while simultaneously monitoring the tunneling current from the conductive cantilever 524.

Conductive path 520 comprises a lead wire 521 which electrically connects the conductive tip to a conductive pad 525 on the cartridge. A spring clip 523 in the head makes electrical contact with pad 525. The spring clip itself is electrically connected to preamplifier 420. Conductive path 526 comprises a spring-loaded lead wire 527 which is bonded to a conductive pad 528 on the cartridge. A spring clip 529 in the head makes electrical contact with pad 528. Since the SFM/STM package 522 must be removable from the head, spring-loaded lead wire 527 rests lightly on a pad 530 on SFM/STM package 522. Spring clips 523 and 529 rest lightly on pads 525 and 528, respectively, allowing removal of the cartridges. The force applied by spring clips 523 and 529 and spring-loaded lead wire 527 must be very small so as not to disturb the kinematic mounting arrangements. Alternative electrical connectors (such as plugs) may be used provided that they likewise do not disturb the kinematic mounts.

Referring again to FIG. 4A, preamplifier 420 is located in close proximity to cantilever 102 (or to any other probe that may be installed in its place) to prevent spurious noise from being picked up and amplified. Preamplifier 420 contains the electronic circuitry necessary to preamplify both scanning force signals and scanning tunneling signals, and therefore can amplify the signal from cantilever cartridge 218, from STM probe cartridge 500, or from SFM/STM probe cartridge 502, whichever one of those cartridges is kinematically mounted in head 108.

The arrangement of this invention thus allows a convenient shift from scanning force microscopy to scanning tunneling microscopy (or combined SFM/STM), by simply replacing an SFM probe cartridge with an STM probe (or SFM/STM probe) cartridge. Thus it is not necessary to use separate SFM and STM heads, as in conventional scanning probe microscopes. A single head is used to perform both scanning force and scanning tunneling microscopy, thereby significantly reducing the time necessary to switch between SFM and STM, and reducing the expense of this capability.

Coarse Sample Movement Stages

Figure 6A:
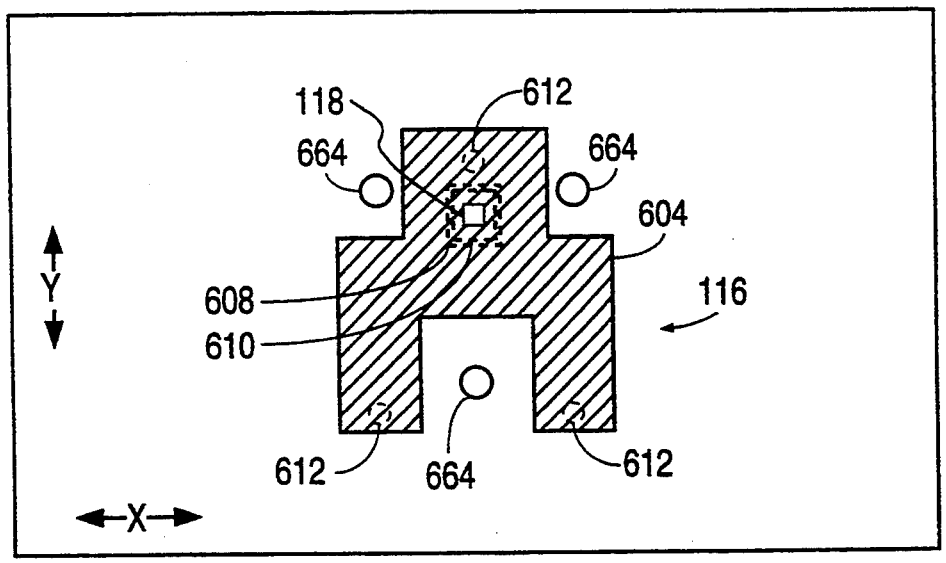
Figure 6C:
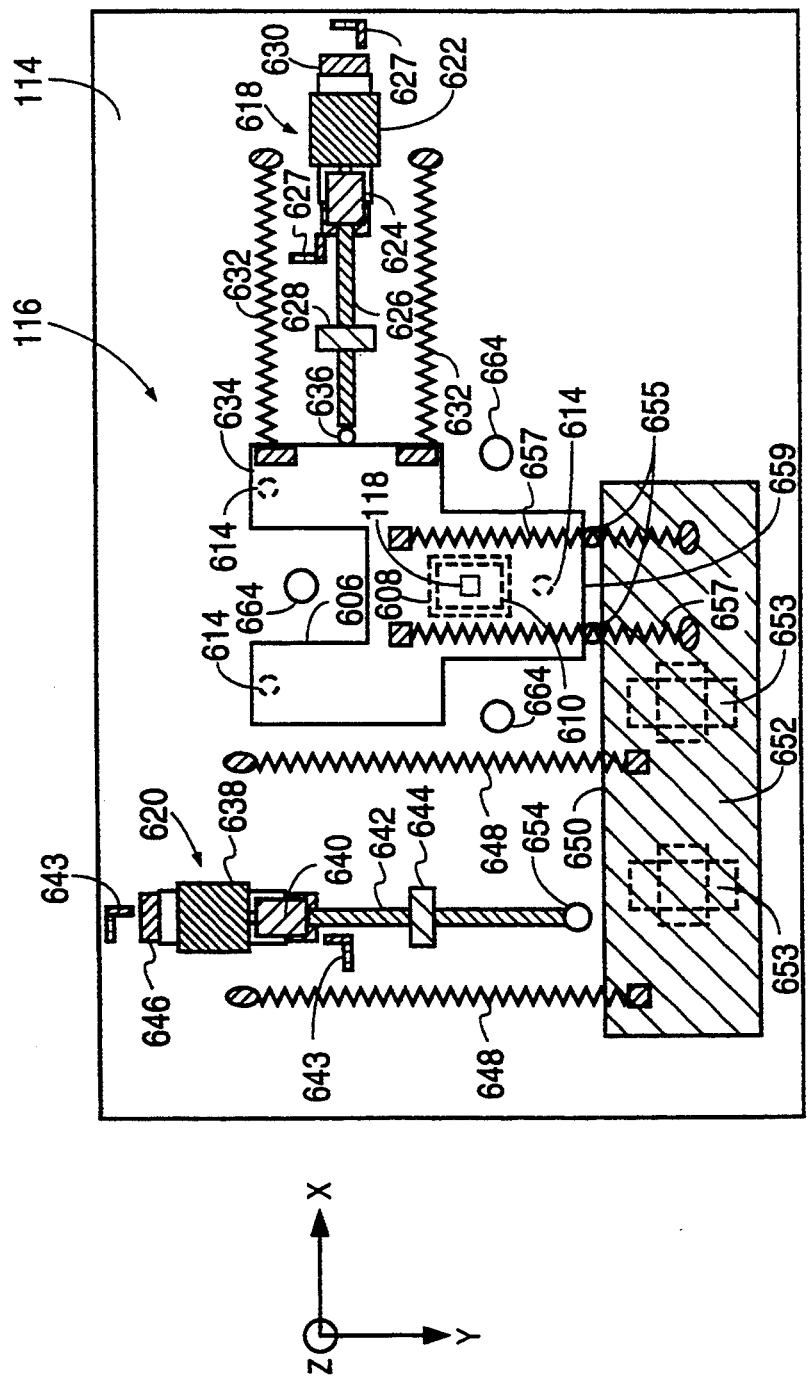

FIGS. 6A, 6B and 6C illustrate schematically top, side and bottom views of x,y coarse stage 116 and z coarse stage 112. Axes are marked on the diagrams for clarity. As shown in FIG. 6B, x,y coarse stage 116 is positioned in an aperture 602 in base 114. Coarse stage 116 is a sandwich-like structure consisting of a top plate 604 and a bottom plate 606 which are bolted together via a metal piece 607 which fits in aperture 602. The entire top plate 604 is visible in FIG. 6A and the entire bottom plate 606 is visible in FIG. 6C. Scanner 118 is inserted into an opening in x,y coarse stage 116, and is attached only to top plate 604 to permit easy removal. Metal piece 607 has edges 610 which are separated sufficiently from edges 608 of aperture 602 to permit x, y coarse stage 116 to move throughout the required range. (The range of x,y coarse stage 116 in the y direction is somewhat greater than in the x direction so that it can be pushed from under head 108 to allow the sample to be changed easily.) FIGS. 6A and 6C show edges 608 and inner edges 610 as hatched lines.

Top plate 604 rests on base 114 via three balls 612 which are attached to top plate 604, and a clamping effect is obtained by three spring-loaded balls 614 which are attached to bottom plate 606 at positions opposite balls 612. As shown in FIGS. 6A and 6C (hatched lines) balls 612 and spring-loaded balls 614 are positioned in a triangular arrangement. To permit x,y coarse stage 116 to slide smoothly on base 114, balls 612 and 614 contact glass pieces 616, which are attached to the upper and lower surfaces of base 114 as shown in FIG. 6B. Glass pieces 616 are preferably ordinary glass microscope slides, and balls 612 and 614 are preferably made of brass. This combination allows x,y coarse stage 116 to slide smoothly with respect to base 114.

FIG. 6C shows x,y coarse stage 116 viewed from the bottom of base 114. The locations of edges 608 of aperture 602 and spring-loaded balls 614 and scanner 118 are shown as hatched lines. Also shown are two horizontal stepper motor assemblies 618 and 620 and a y pushing plate 652. Pushing plate 652 is attached to the bottom of base 114 by two slide mechanisms 653, which permit it to move in the y direction. Two balls 655 are fixed to an edge of pushing plate 652 and springs 657 bias balls 655 against a smooth straight edge 659 of bottom plate 606.

Stepper motor assembly 618 which moves the stage in the x direction as indicated includes a stepper motor 622, the drive shaft of which is axially connected via a flexible coupler 624 to a screw 626 which is threaded through a fixed nut 628 mounted on base 114. Stepper motor 622 slides on a slide rail 630 mounted on base 114 as screw 626 advances or retreats through fixed nut 628. A pair of springs 632 bias an edge 634 of bottom plate 606 against a ball tip 636 of screw 626. Limit switches 627 limit the travel of stepper motor 622 on slide rail 630. Stepper motor assembly 618 is also shown in FIG. 6B.

Similarly, stepper motor assembly 620 which moves the stage in the y direction as indicated includes a stepper motor 638 the drive shaft of which is axially connected via a flexible coupler 640 to a screw 642 which is threaded through a fixed nut 644 mounted on base 114. Stepper motor 638 slides on slide rail 646 mounted on base 114 as screw 642 advances or retreats through fixed nut 644. A pair of springs 648 bias a smooth straight edge 650 of y pushing plate 652 against a ball tip 654 of screw 642. Limit switches 643 limit the travel of stepper motor 638 on slide rail 646.

The operation of x,y coarse stage 116 can now be described. When x,y coarse stage 116 is at rest, it is supported by balls 612 which are pressed against glass pieces 616 by gravity and by spring loaded balls 614. When movement in the x direction is desired, stepper motor 622 is turned on, turning screw 626 in fixed nut 628. If screw 626 is rotated clockwise, it advances through fixed nut 628, pressing ball tip 636 against edge 634 and pushing bottom plate 606 to the left (in FIG. 6C). If screw 626 is rotated counterclockwise, its tip retracts from edge 634, and springs 632 contract, pulling bottom plate 606 to the right. In either case, balls 655 slide along edge 659 of bottom plate 606. Y pushing plate 652 is prevented from moving in the x direction by slide mechanisms 653. When movement in the y direction is desired, stepper motor 638 is turned on, turning screw 642 in fixed nut 644. If screw 642 is rotated clockwise it advances through fixed nut 644, pressing ball tip 654 against edge 650 of y pushing plate 652. Y pushing plate 652 slides in the y direction (downward in FIG. 6C), guided by slide mechanisms 653. Since springs 657 bias edge 659 of bottom plate 606 against balls 655, bottom plate 606 is also pulled in the y direction (downward in FIG. 6C). This process is reversed when screw 642 is retracted. Springs 648 pull y pushing plate against ball tip 654, and y pushing plate slides in the reverse direction (upward in FIG. 6C). Balls 655 press on edge 659, pushing bottom plate 606 upward. Edge 634 slides against ball tip 636.

The position of x,y coarse stage 116 is thus defined—kinematically—by six contact points: the three contact points between balls 612 and glass pieces 616, the two contact points between balls 655 and bottom plate 606, and the contact between ball tip 636 of screw 626 and bottom plate 606. This assures that there is only one unique position of x,y coarse stage 116 for each setting of screws 626 and 642.

This design significantly reduces the effect that dimensional changes and vibrations can have on the position of the sample relative to the probe. This is an important consideration in an SPM, since dimensional or other changes on the order of a micron or less can significantly degrade the quality of the image. Since stepper motors 622 and 638 are mounted on slide rails and flexibly coupled to screws 626 and 642, respectively, which in turn are driven through fixed nuts 628 and 644, the effect of thermal expansion or vibration between a motor and a fixed nut will be to move the motor along its slide rail. Only displacements that occur on the other side of fixed nuts 628 and 644 can affect the position of the sample relative to the probe. By this configuration using "floating" motors and a single, non-stacked x,y stage, the mechanical loop of the coarse translation stage is significantly reduced, especially when compared with stacked x,y stage configurations. This minimizes the effect of mechanical and thermal variations on the spacing between the probe and the sample.

There are numerous alternative embodiments of this design. For example, the position of the y stepper motor can be reversed so that it pushes in the opposite direction against the y pushing plate (upwards in FIG. 6C). The disadvantage of this arrangement, however, is that any dimensional changes or vibration in the y pushing plate will be transferred to the x,y coarse stage.

Figure 6D:
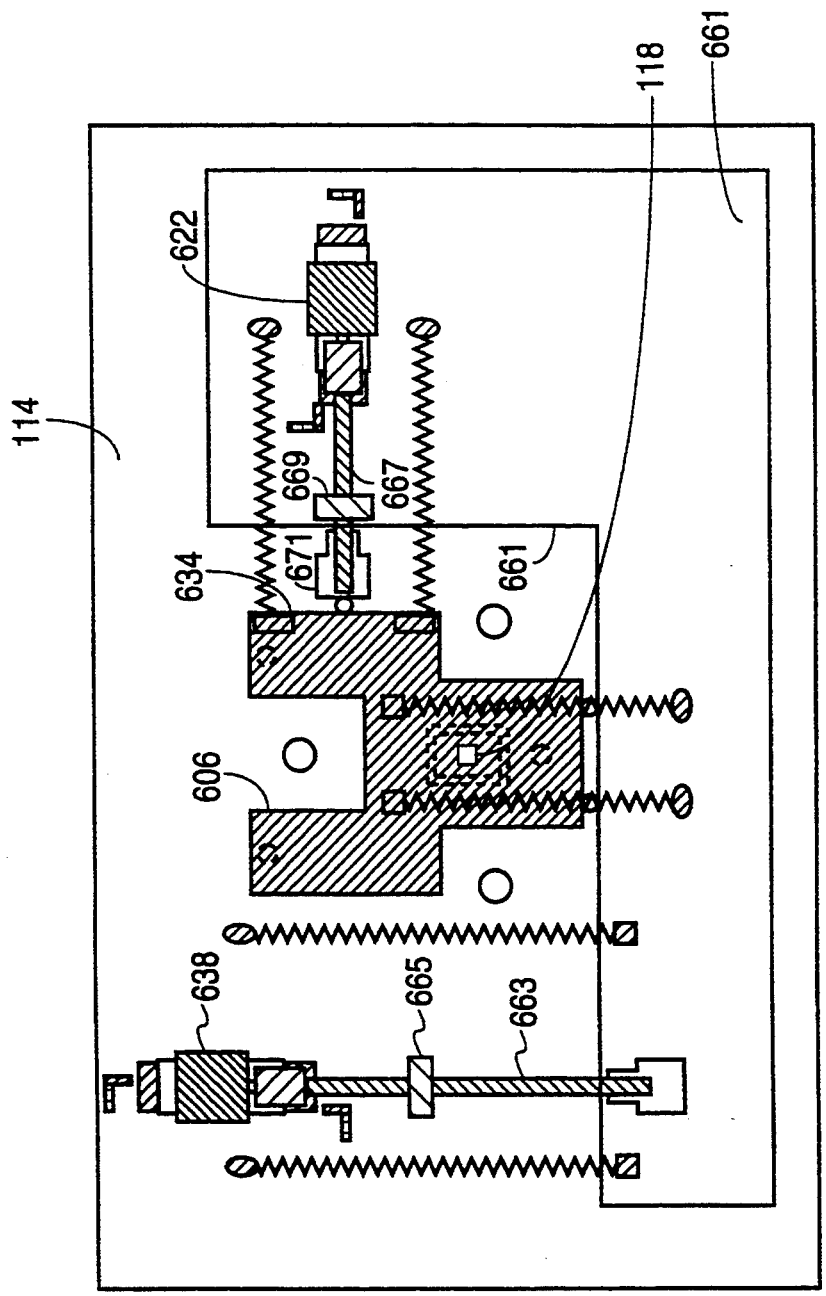
FIG. 6D illustrates a bottom view of an alternative embodiment of an x,y coarse stage.

Another alternative embodiment is illustrated in FIG. 6D. Elements in FIG. 6D that are identical to those shown in FIG. 6C are similarly numbered. In this embodiment, an extended y pushing plate 661 is used, and stepper motor 622 is mounted on the y pushing plate 661 as shown (instead of the base). An extended screw 667 is coupled to the drive shaft of stepper motor 622 and journaled in a fixed bearing 669 which is also fixed to the y pushing plate 661 as shown. A lead screw 671 having a ball-tipped contact, pushes against edge 634 of bottom plate 606. No slide rail is used in this configuration. An extended screw 663 is coupled to the drive shaft of stepper motor 638 and journaled in a fixed bearing 665. The end of screw 663 is threaded into a tapped hole in y pushing plate 661. Movement of y pushing plate 661 on the y axis is obtained as stepper motor 638 turns screw 663 in the tapped hole in y pushing plate 661. Movement on the x axis is obtained as stepper motor 622 turns screw 667 in lead screw 671 so as to push the ball tip of the lead screw against or retract it from bottom plate 606. Otherwise, the operation is essentially the same as that described in connection with FIG. 6C. Stepper motors 622 and 638 need not be mounted on slides in this embodiment, but may be if so desired. This embodiment is believed to be equivalent to the embodiment shown in FIG. 6C, having an equivalent mechanical loop, but the machining costs may be somewhat higher.

Numerous other embodiments will be apparent to those skilled in the art. For example, any encoded or well-calibrated motor may be used in place of stepper motors. The y pushing plate and x,y coarse stage may be biased against the various contact points by magnets or other biasing means besides springs. Smooth surfaces other than glass or brass may be used to support x,y coarse stage 116. A wide variety of arrangements may be substituted for the opposing ball-straight edge combination shown in FIGS. 6C and 6D. For example, opposing straight edges and various types of curved surfaces may be used provided that they yield the requisite number of contact points and that a means for assuring continuous contact at those points is provided. Two contact points may be provided with edge 634, and one contact point may be provided with edge 659 of bottom plate 606. The total number of contact points with those edges must be three.

The z coarse stage 112 is primarily illustrated in FIG. 6B. Three stepper motor assemblies 656 are shown. Stepper motors 658 are mounted vertically on slide rails 660 attached to base 114 and have their drive shafts attached through flexible couplers 672 to z approach screws 664. Z approach screws 664 are threaded through fixed nuts 666 in base 114 and have ball tips 668 which contact kinematic mounting points 670 on a lower surface of head 108. The relative positions of z approach screws 664 are illustrated in FIGS. 6A and 6C, and, as indicated, form a triangular pattern which surrounds bottom plate 606 yet allows it to travel in the x and y directions within the ranges defined by limit switches 627 and 643. Kinematic contact points 670 on the lower surface of head 110 are in this same triangular pattern, and accordingly head 108 is stably supported but free to tilt or pitch in any direction as any one or more of z approach screws 664 are adjusted independently. Kinematic contact points 670 may be, for example, a cone, a slot and a flat, respectively. Head 108 is loaded against z approach screws 664 by its own weight and by a biasing spring (not shown). Application Ser. No. 07/668,886, filed Mar. 13, 1991, describes a general kinematic mounting arrangement of this kind.

When stepper motors 658 are actuated, individually or in any combination, they turn z approach screws 664 through fixed nuts 666 and raise or lower ball tips 668. At the same time, stepper motors 658 slide along slide rails 660. Limit switches 674 and 676 are provided at the upper and lower ends, respectively, of slide rails 660 to turn off stepper motors 658 when they reach preselected upper and lower limits on slide rails 660.

Stepper motors 658 are activated separately by computer controls (not shown). Accordingly, within the ranges defined by limit switches 674 and 676, stepper motors 658 can be used to vary the tilt or pitch of head 108 and to elevate or lower it to any position above sample 104. Thus, while viewing cantilever 102 through an optical viewing assembly (described below), this motorized arrangement can be actuated so as to cause cantilever 102 to approach the sample surface slowly until the fine movement mechanism takes over and establishes the correct cantilever deflection. Moreover, the tilt and pitch of the cantilever may be adjusted in order to assure that a corner of the chip does not touch the sample surface and that the cantilever is pitched properly with an optimum initial deflection to respond to the profile of the sample surface. Prior art SFMs do not generally have this automated ability, which gives this arrangement flexibility and convenience for positioning the probe properly with respect to the sample.

Unless stated otherwise, references herein to the z direction refer to axis that is normal to the sample surface (this is also referred to as the vertical height). References to the x,y direction refer to axes in the plane of the sample surface (this is also referred to as the horizontal direction, lateral direction or scanning direction). Unless specifically stated, references to the x,y and z directions do not imply a specific orientation in space (e.g., relative to gravity).

Fine Sample Movement Stage

The structure and operation of scanner 118 are illustrated in FIGS. 7 and 8. FIGS. 7A and 7B show a piezoelectric tube scanner 700. Piezoelectric tube scanner 700 is in the form of a hollow cylinder made of a piezoelectric ceramic material, with four segmented outer electrodes 702a, 702b, 702c and 702d on the outer walls and one continuous inner electrode 704 covering the cylinder's inner surface. It is fixed to the base at one end. The application of voltages of opposite sign to opposing outer electrodes (e.g., 702a and 702c) drives the free end of tube scanner 700 in a lateral direction, as illustrated in FIG. 7C, by causing the opposing quadrants of the scanner tube to expand and contract, respectively. A voltage applied to inner electrode 704 while the outside electrodes are held constant causes the tube scanner 700 to expand or contract. Since one end of tube scanner 700 is fixed to x,y coarse stage 116 (see FIG. 6B), this drives its free end, on which the sample is mounted, in the z direction. Accordingly, depending on the voltage applied to electrodes 702a–702d and 704 the sample moves in the x, y or z directions relative to x,y coarse stage 116 and the probe. As noted above, the operation of a piezoelectric tube scanner is described in an article by G. Binnig et al., *Review of Scientific Instruments*, v. 57, p. 1688 (August 1986).

Figure 8A:
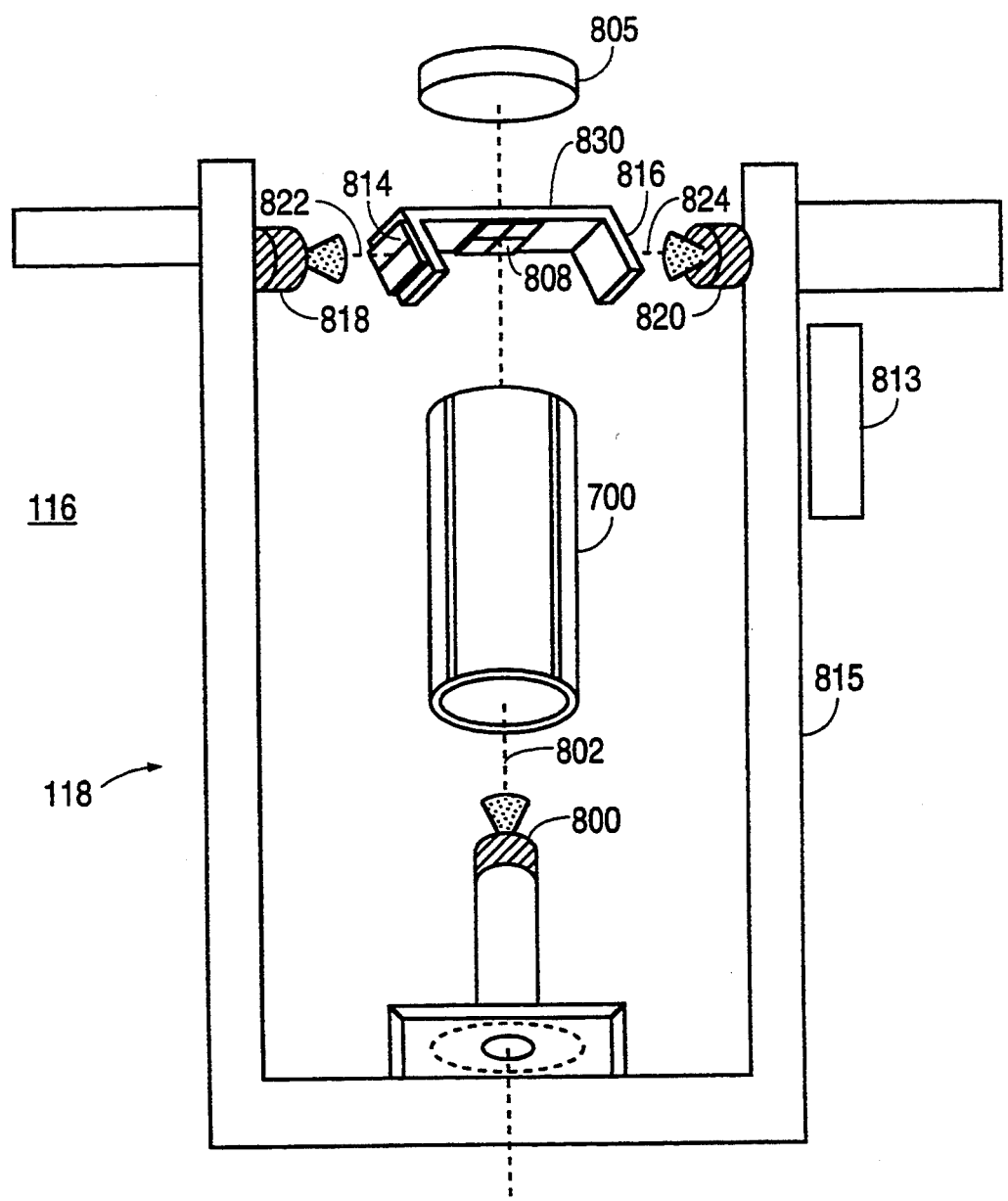
FIG. 8A illustrates an exploded view of the scanner and x,y and z position detectors.

FIG. 8A illustrates an exploded view showing how tube scanner 700 is mounted in x,y coarse stage 116. Mounted at the base of tube scanner 700 is a light emitting diode (LED) 800, which directs a light beam 802 upward along the vertical axis of tube scanner 700. Another light source may be substituted for LED 800. A sample platform 805 is mounted at the top of tube scanner 700. A quad-cell PSPD 808 is mounted in line with the axis of tube scanner 700. Thus, when tube scanner 700 is in its normal position, light beam 802 strikes the center of quad-cell PSPD 808. Attached at right angles to quad-cell PSPD 808 are bi-cell PSPDs 814 and 816, which extend downward over the outside surface of tube scanner 700 and emit light beams 822 and 824, respectively. Tube scanner 700 is enclosed in a housing 815. LEDs 818 and 820 are mounted opposite bi-cell PSPDs 814 and 816, respectively, on housing 815.

Figure 8B:
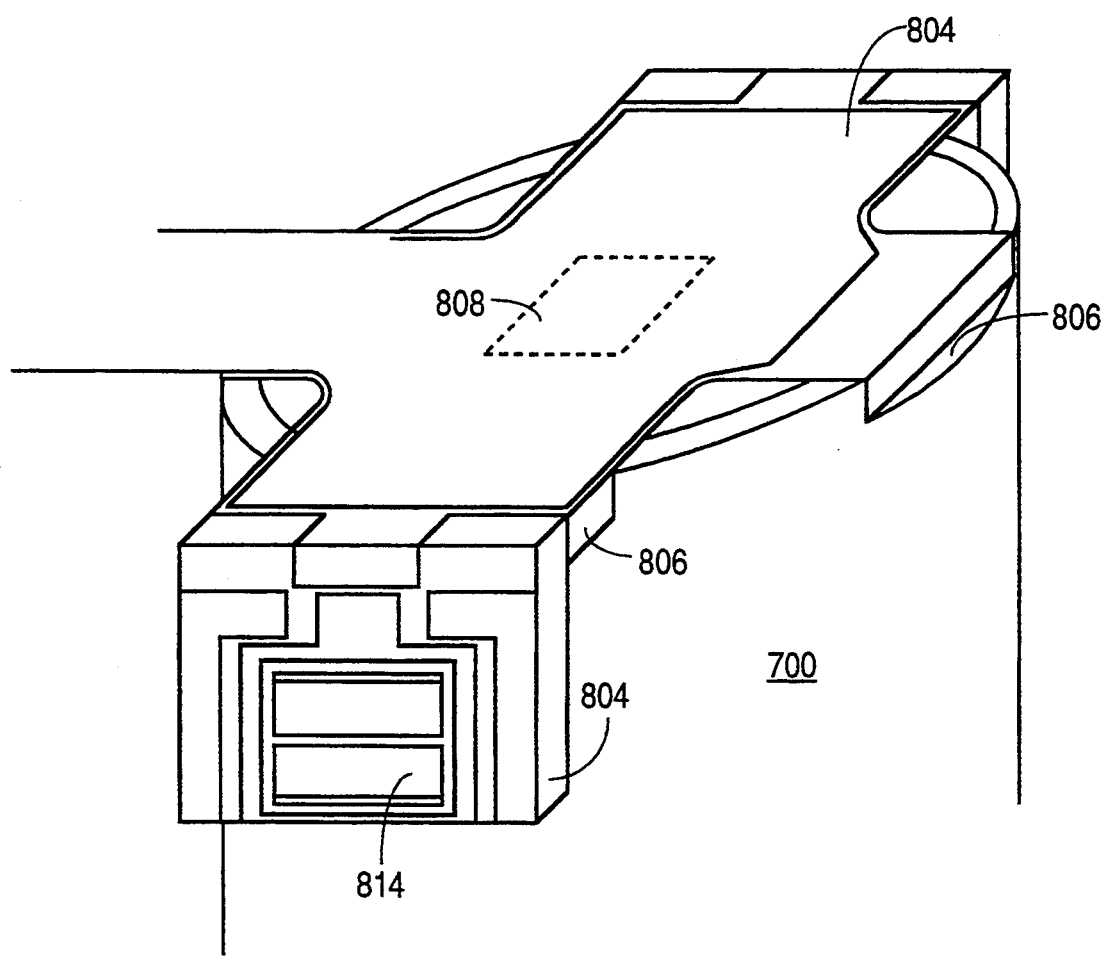
FIG. 8B illustrates a detailed perspective view of the z position detectors.

FIGS. 8A and 8B show two ways to situate PSPDs 808, 814 and 816 with respect to the fine stage tube. In FIG. 8A the quad cell PSPD 808 and bi-cell PSPDs 814 and 816 are mounted on a locating fixture 830. Sample platform 805 is also mounted on fixture 830. Fixture 830, through some mechanical alignment features, either on fixture 830 or on the tube scanner 700, is located precisely relative to the tube, to avoid coupling between the detector signals. For example, quad cell PSPD 808 must be oriented so that its quadrants are precisely aligned with the four outer electrodes 702a–702d of the tube scanner 700 to ensure that the detection directions of PSPD 808 will be parallel to the x and y scan directions, respectively. Furthermore, the two bi-cell PSPDs 814 and 816 must be oriented so that each senses tilt only about an axis that is perpendicular to the fast scan direction. This ensures that the signal from both when added together is insensitive to tilt. Thus fixture 830 aligns properly to the tube scanner 700, and the electronic signals of the three PSPDs 808, 814, 816 are sent (via wires or flexible printed circuit board, not shown) to a preamp 813, which is mounted on the scanner housing 815. The preamp 813 should be located near fixture 830 to minimize noise pickup.

FIG. 8B shows the fixture 830 replaced by a rigid PCB 804 on which are mounted PSPDs 808, 814 and 816. PCB 804 fits into notches 806 in the tube scanner so as to precisely align PSPDs 808, 814 and 816 with the axis of tube scanner 700, as well as the scan directions. Electrical connections are made to quad-cell PSPD 808 and bi-cell PSPDs 814 and 816 through conductive lines and vias in PCB 804. PCB 804 may be machined to the shape shown in FIG. 8B or may be formed of three PCBs joined to one another at right angles.

Alternatively, the LEDs may be mounted on tube scanner 700, and the bi-cell PSPDs may be mounted on an adjacent structure facing the LEDs.

The scanner housing is mounted to the x-y stage 116 by bolting the two together.

The position at which the light beam 802 strikes quad-cell PSPD 808 provides an accurate indication of the movement of sample platform 805 (and hence the sample) in the x and y directions. Similarly, the positions at which the light beams 822 and 824 strike bi-cell PSPDs 814 and 816, respectively, indicate the position of the sample in the z direction.

Figure 7D:
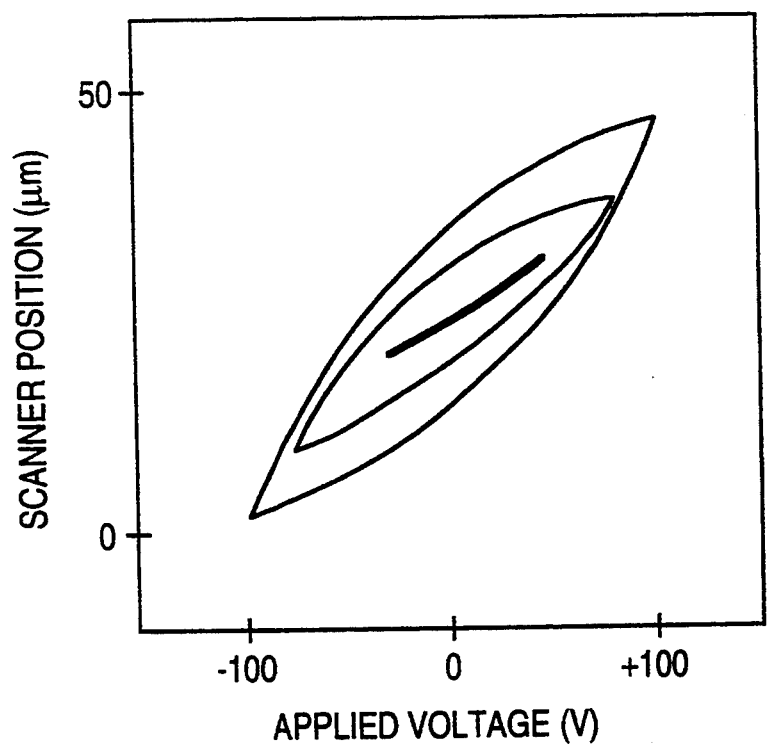
FIG. 7D illustrates a graph showing the hysteresis associated with a piezoelectric tube scanner.

FIG. 7D illustrates the movement of the upper end of tube scanner 700 as a function of the voltage difference applied to two of the opposing electrodes 702a–702d (e.g., 702a and 702c). Two things will be noted about this behavior. First, the movement of tube scanner 700 is not a linear function of the applied voltage difference, e.g., doubling the voltage difference results in a position difference which is less than twofold. Second, hysteresis is evident, i.e., the position of tube scanner 700 for a given applied voltage depends on whether the voltage is increasing or decreasing. Third, although not evident from FIG. 7D, tube scanner 700 also exhibits creep, which is a drift in the direction of recent movements. These characteristics lead to distortions in the representation of a surface which must be corrected in order to obtain a true image of the surface.

Figure 9:
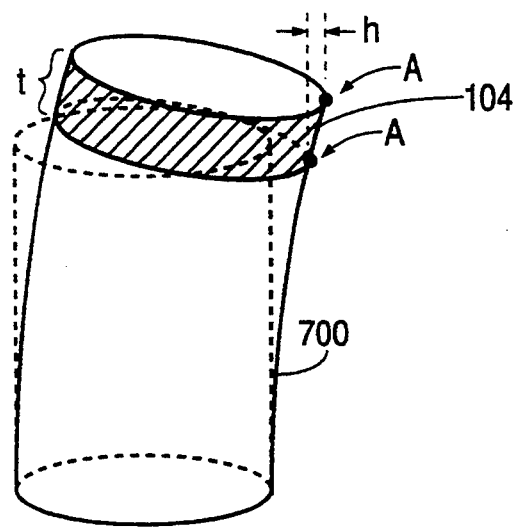
FIG. 9 illustrates in exaggerated fashion the lateral movement of a piezoelectric tube scanner.

FIG. 9 illustrates schematically in an exaggerated fashion two additional causes of distortion in the image generated by the scanning probe microscope. As noted above, the bottom of tube scanner 700 is fixed to x,y coarse stage 116. As voltages are applied to opposing electrodes, tube scanner 700 bends, as illustrated in FIG. 9, thereby moving sample 104 laterally. This bending has two undesirable effects on the position of sample 104. First, as sample 104 is moved laterally, it tilts downward in the direction of its movement. The only position in which sample 104 is not tilted is when no voltage differential is applied to the opposing electrodes of tube scanner 700. Second, an error is also introduced by the thickness of sample 104. As illustrated in FIG. 9, a point A will appear to be displaced by a horizontal distance h as the thickness of sample 104 increases by an amount t.

The outputs of quad-cell PSPD 808 and bi-cell PSPDs 814 and 816 can be used to provide accurate representations of the position of the sample in the x, y and z directions, as described below.

Figure 10A:
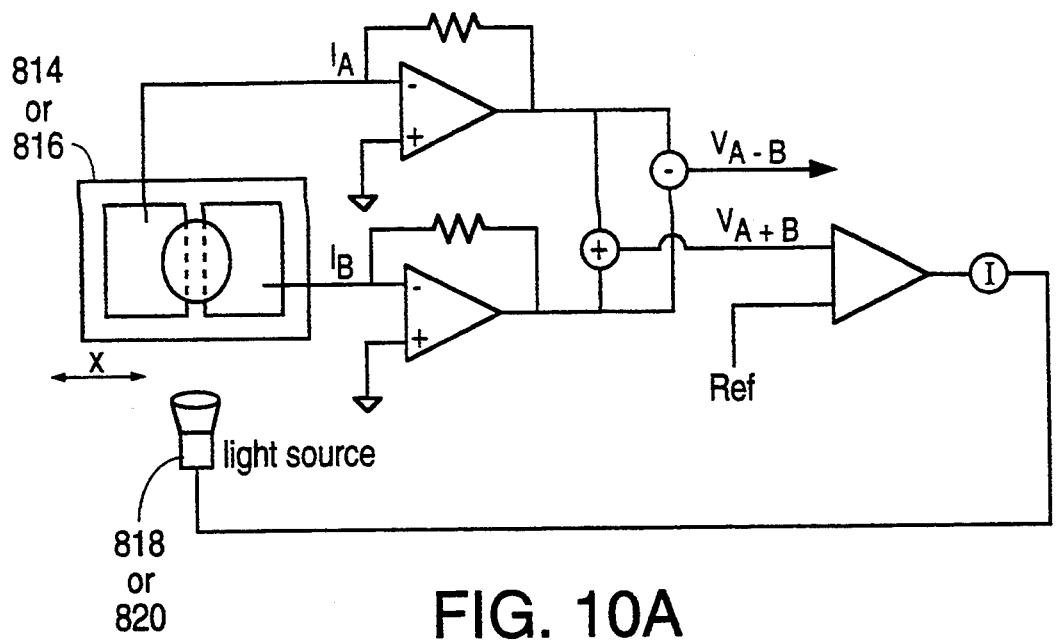
FIG. 10A illustrates a diagram of a circuit for obtaining an output signal from each of the z position detectors.

FIG. 10A illustrates the circuit associated with each of the bi-cell PSPDs 814 and 816. Currents from the two cells of each PSPD are converted into voltages and compared to obtain an output voltage ($V_A-V_B$) representative of the position of a light spot on the PSPD. In addition, the voltages are added together and compared with a reference voltage. The resulting signal, which is proportional to the total intensity of light hitting the PSPD, is connected in a feedback loop with LED 818 or 820 to drive current to the LEDs in order to correct for fluctuations in light intensity.

Figure 10B:
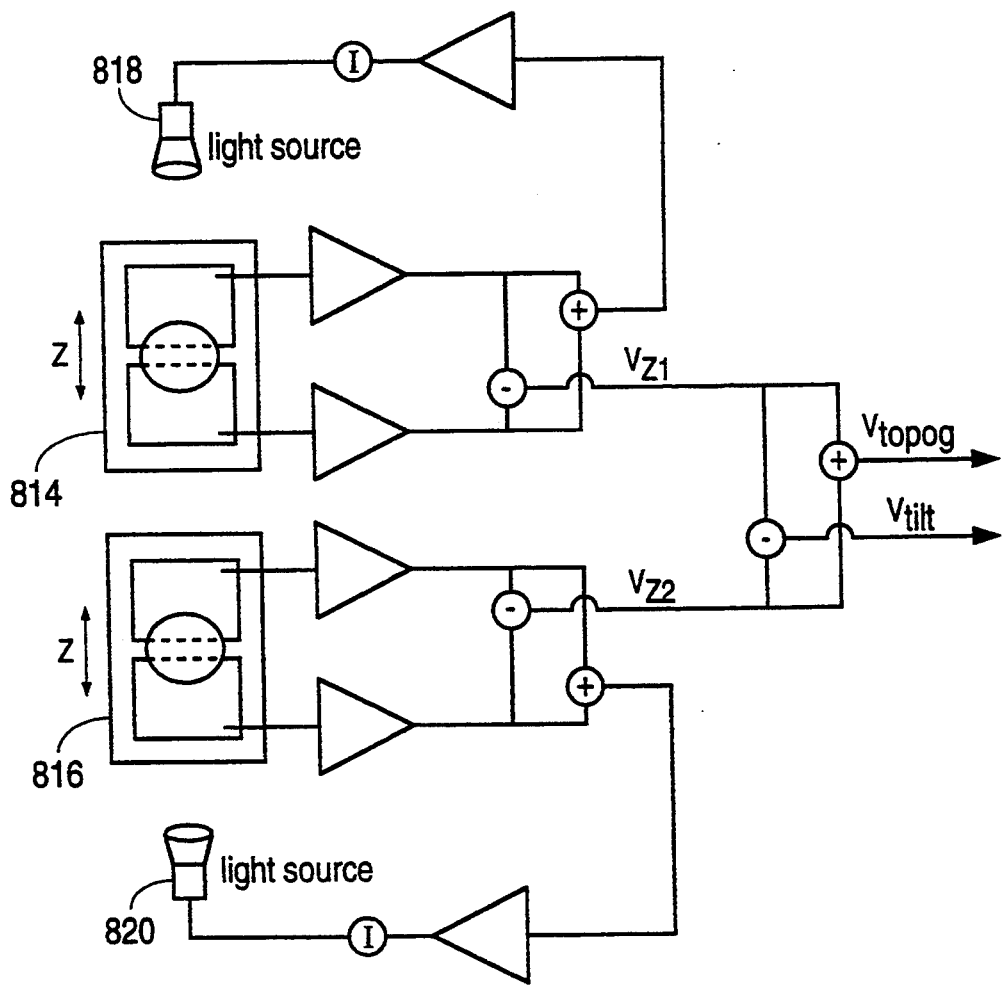
FIG. 10B illustrates how the z position signal is obtained from both z position detectors.

FIG. 10B shows how the outputs of bi-cell PSPDs 814 and 816 ($V_{Z1}$ and $V_{Z2}$, respectively) are used to obtain a signal $V_{topog}$ which represents changes in sample position excluding the effects of sample tilt. Alternatively, as shown in FIG. 10B, these outputs can be used to obtain a signal $V_{tilt}$ which represents solely a measurement of sample tilt at each point in a scan. For a given tube bending, the output of one of the bi-cell PSPDs (e.g. $V_{Z1}$) will represent changes in z position due to topography plus tilt, since that side of the scanner will tilt upwards, while the output of the other hi-cell PSPD ($V_{Z2}$) will be due to topography minus tilt, since that side will tilt downwards. The sum, $V_{Z1}+V_{Z2}$, will therefore represent changes in z due solely in response to topography. The difference, $V_{Z1}-V_{Z2}$, will give a measure of sample tilt. The outputs from PSPDs 814 and 816 are connected electrically to preamp 813 (FIG. 8A). Means are also provided to input the amplified signal to the controller. A connector also couples power to the amplifier, LEDs, PSPDs, and scanner tube and couples the x,y, position signals to their controller (or section thereof). A rigid flex is used for these connections, but alternatively wires could be used.

Oppositely mounted PSPDs such as PSPDs 814 and 816 may also be used with nontubular types of piezoelectric scanners to provide a z position signal independent of the tilting of the sample.

Figure 10C:
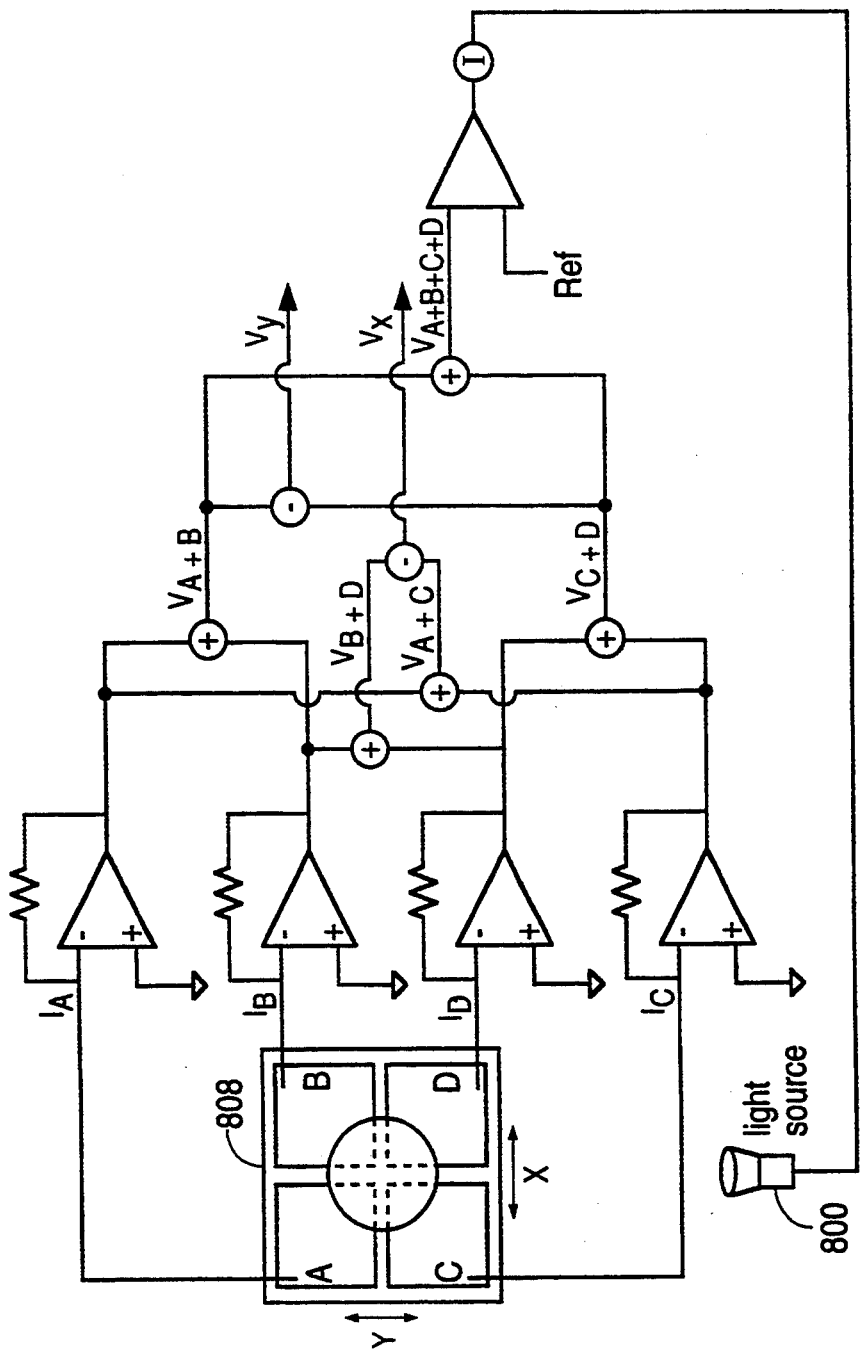
FIG. 10C illustrates a diagram of a circuit for obtaining x and y position signals from the x,y position detector.

FIG. 10C illustrates the circuit associated with quad-cell PSPD 808. As with bi-cell PSPDs 814 and 816, the outputs of the four cells are summed, compared with a reference voltage, and fed back to LED 800 to correct for intensity variations. In addition, the outputs of cells A and B are summed and compared with the sum of the outputs of cells C and D to obtain an output $V_y$ representing the y position of the sample. The outputs of cells A and C are summed and compared with the sum of the outputs of cells B and D to obtain an output $V_x$ representing the position of the sample in the x directions.

Several techniques for improving image quality will now be described, many of which utilize the signals representing the actual position of the sample in the x,y and z directions.

Figure 11A:
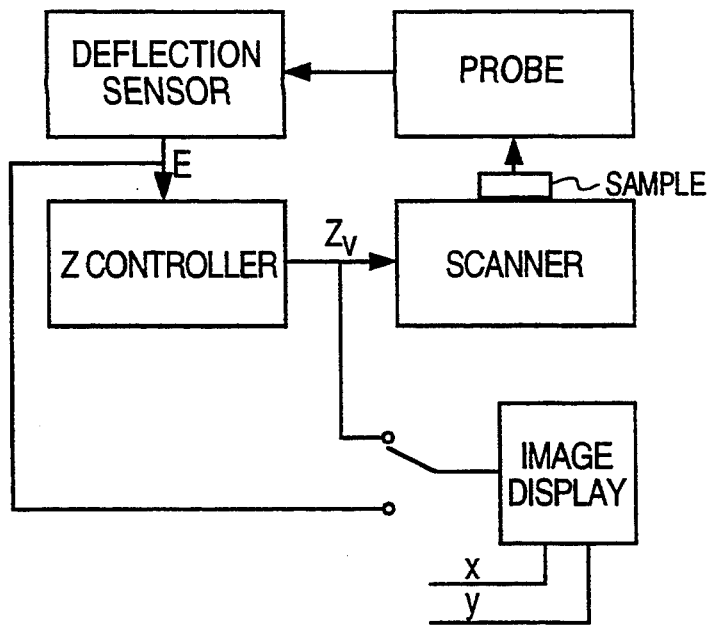
FIG. 11A illustrates a conventional feedback loop and data path for an SPM.

FIG. 11A illustrates a block diagram of a conventional feedback loop for controlling the position of a sample in the z direction. A probe is positioned relative to a sample, and changes in the probe-to-sample distance are measured by a deflection sensor. The deflection sensor compares this signal with a reference signal (for instance, a desired displacement value) and generates an error signal E which is passed to a controller. The controller applies an algorithm to the error signal and generates a z feedback voltage $Z_y$. The z feedback voltage actuates the scanner to bring the probe-to-sample distance back to its desired level (i.e., zero the error signal). The controller may be constructed purely from analog circuit elements, or from a combination of analog and digital signal processing elements and software, as is known to persons skilled in the art.

Generally the image is formed by recording the z feedback signal at each image point. However, as described above, the scanner typically has a nonlinear vertical or horizontal response to an input voltage, and hence the voltage required to maintain a zero error signal will not be a linear function of sample height. The resulting image will be representative of the sample surface topography distorted by the nonlinear response of the scanner. This is a major disadvantage of conventional SPM systems.

As shown in FIG. 11A, the image may also be generated from the error signal E. This may be done in cases where the error signal is nonzero because, for example, the controller and scanner are not able to respond fast enough to changes in surface topography to maintain a constant probe-to-sample distance. If the error signal is sufficiently large, an image generated using the z feedback voltage will not accurately represent the surface topography, and the prior art solution is to use the error signal instead. This is not a perfect solution, however, because the error signal itself does not contain all of the topographical information needed to generate an accurate image.

Figure 11B:
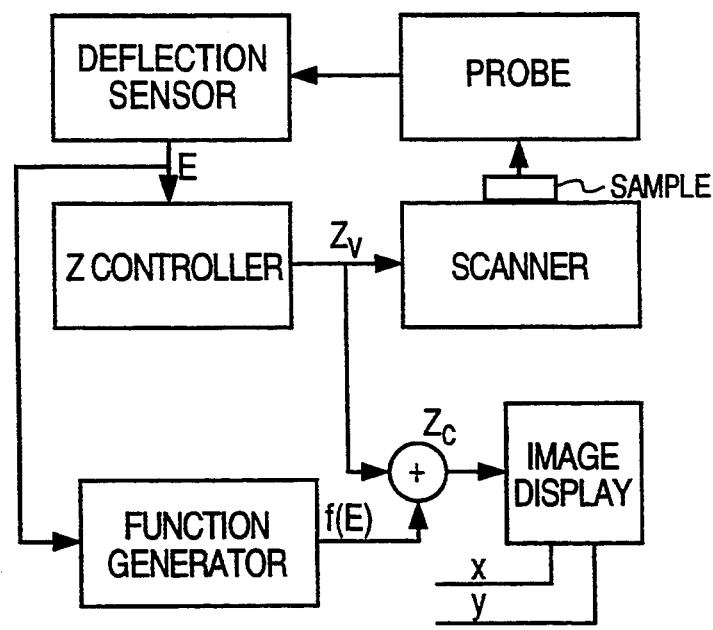
FIG. 11B illustrates an improved feedback loop in accordance with the invention.

An improved image may be obtained by using the technique illustrated in FIG. 11B. The error signal is passed through a function generator and added to the z feedback signal in order to record a composite image. For small values of E, the corrected signal $Z_c$ can be assumed to be a linear function of the error signal, i.e., $Z_c = Z_v + aE$, where e is a constant. For larger errors, the corrected signal is some other function of E, i.e., $Z_c = Z_v + f(E)$.

Figure 11C:
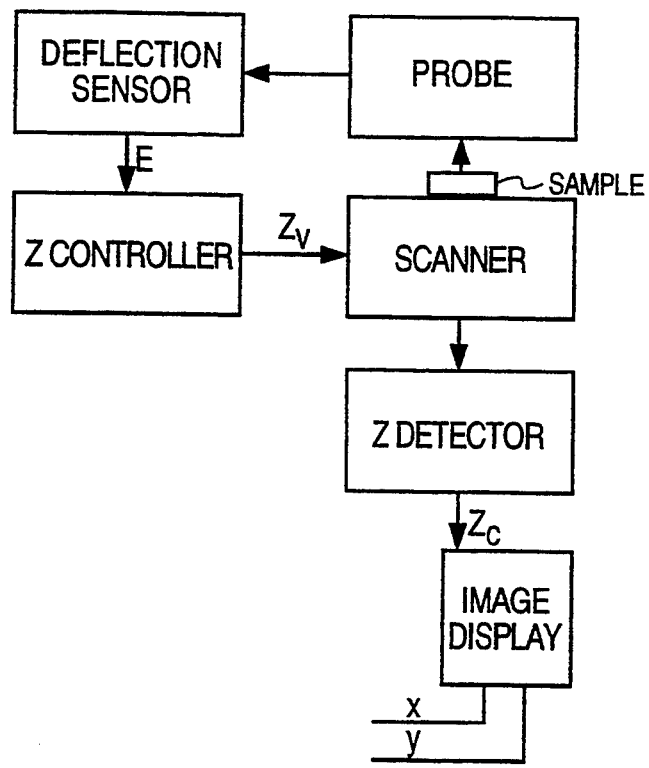
FIG. 11C illustrates an embodiment with the output delivered from the z detector.

FIG. 11C–11F illustrate feedback loops which have significant advantages over the prior art feedback loop illustrated in FIG. 11A. In FIG. 11C, a z detector is used to accurately measure the z position of the scanner. The z detector may comprise bi-cell PSPDs 814 and 816 (FIG. 8A), in which case the output of the z detector is $V_{Z1} + V_{Z2}$ (FIG. 10B). As described above, the sum of these two signals excludes the effects of sample tilt. When the error signal E is successfully zeroed, the output of the z detector provides an accurate image of the surface topography, which excludes effects of nonlinear behavior and hysteresis in the scanner. This feedback loop can be combined with other elements which add some function of any remaining error to generate a corrected image (as shown in FIG. 11B).

Figure 11D:
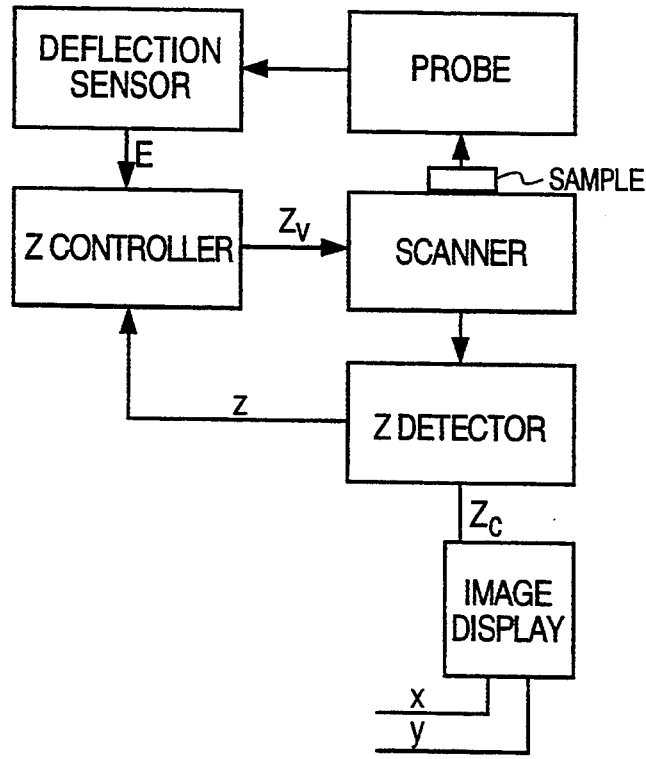
FIG. 11D illustrates an embodiment with the output of the z position detector delivered to the z controller.

The feedback loop illustrated in FIG. 11D contains an additional feedback path from the z detector to the controller. This improves the z feedback loop, by permitting feedback parameters such as the proportional gain, integral gain, differential gain, and bandwidth to be adjusted in response to the signal from the z detector. For example, if the probe is approaching a very steep surface feature, the response of the scanner may be too slow and the probe tip may be damaged. In this case, the controller compares the rate of change of $Z_z$ with a reference signal and delivers a z feedback voltage that causes the scanner to pull the sample away from the probe. (The feature may be indicated by a very bright spot on the image and may be removed using image processing software, for example, if it is an isolated feature not of interest.) The feedback loop illustrated in FIG. 11D also permits the scanner to move in the z direction at a rate equal to or faster than its resonance frequency. If, for example, the topography varies so rapidly that the scanner must be driven at a frequency at or above its resonance frequency, a magnified z feedback voltage is applied to compensate for the inhibited scanner motion. This is equivalent to opening up the bandwidth of the feedback loop.

Figure 11E:
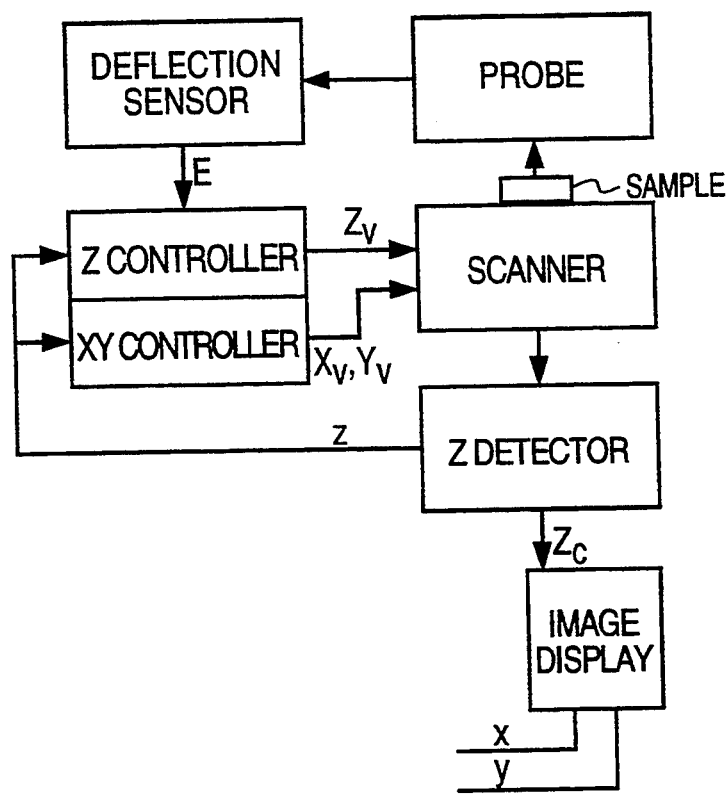
FIG. 11E illustrates an embodiment with the output of the z position detector delivered to the x,y controller.

FIG. 11E shows the controller divided into xy and z sections, respectively, which deliver horizontal and vertical actuating voltages to the scanner. In this embodiment, the output of the z detector ($V_{Z1} + V_{Z2}$ in FIG. 10B) is delivered to both the xy and z sections of the controller. This configuration allows both the scanning rate and scanning path to be adjusted in accordance with the actual surface topography detected by the z detector. For example, if the surface topography varies so rapidly that at a given scanning rate that the required z feedback signal lies outside the bandwidth of the z controller, the xy outputs of the controller ($X_v$ and $Y_v$) are adjusted to slow the scanning rate. On the other hand, if the probe encounters a very large feature on the surface, the controller may recognize a large z gradient (exceeding a reference value) and adjust the horizontal scan path so that the probe moves around the feature. The z section of the controller uses the output of the z detector to compute a z gradient and if the computed value exceeds a reference value, it instructs the x,y section to make the necessary adjustments to the scanning path. This process continues so long as the feature is encountered.

Figure 11F:
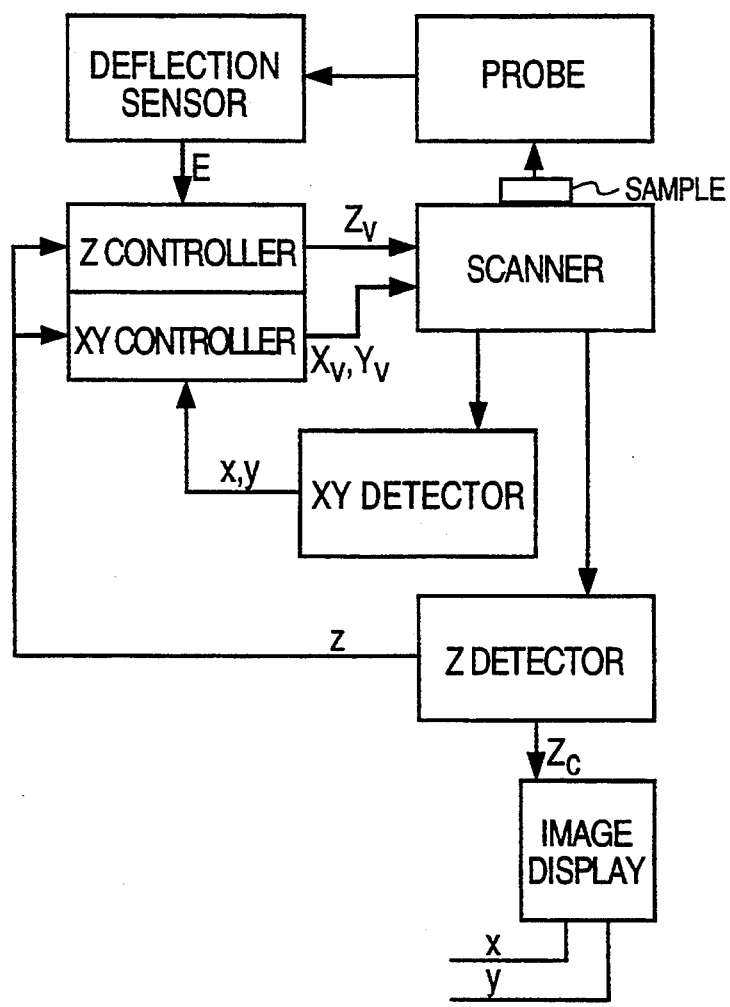
FIG. 11F illustrates an embodiment with the output of an x,y position detector delivered to the x,y controller.

In FIG. 11F, the outputs of the x,y detector ($V_x$ and $V_y$ in FIG. 10C) are delivered to the x,y section of the controller. This configuration provides in addition a correction for the nonlinearities inherent in the lateral movement of the scanner, as described in application Ser. No. 07/766,656 (now U.S. Pat. No. 5,210,410), filed Sep. 26, 1991.

In the embodiments shown in FIGS. 11C–F, if the error signal E is nonzero, it may be passed through a function generator and added to the output of the z detector in the manner described in conjunction with FIG. 11B.

We have also discovered several new scanning techniques that may be used when the output of the x,y position detector is fed back to x,y section of the controller to correct for nonlinearities and hysteresis in the scanner (as shown in FIG. 11F). With the effect of hysteresis eliminated, the position of the scanner for a given x,y input voltage is the same in the forward and reverse scan directions. This means that data may be obtained and an image generated in both directions. The scanner may be stepped to a new line after each scan; there is no need to retrace each line. This reduces the time required to generate an image.

Alternatively, the forward scan on each line may be used to set the scan parameters to optimize values based on the topography of the sample, and these optimized values can be used when the topography is rescanned in the reverse direction. For example, if the surface topography varies at a rate greater than the scanner's maximum response rate, the scan rate can be reduced for that line. Variations in scan parameters such as: scan direction, location and area, dynamic range, feedback filter parameters, tip contact force, tunneling current or voltage, scanning rate, and data processing can all be calculated from the data recorded during the initial scan and applied during the reverse scan. Other variations may be appropriate according to the type of piezoelectric tube. Furthermore, such analysis may be used to determine if multiple repeat scans with different parameters are required to optimally analyze the surface.

A feedback loop using the x,y position sensor also permits scanning to be done at a frequency greater than the scanner's resonant frequency in the x,y direction. With normal prior art devices, the response of the scanner to an input signal above its resonant frequency is greatly reduced and out of phase. Feedback reflecting the x,y position of the scanner automatically compensates for these effects by adjusting the input signal.

Similarly, using a feedback loop which includes a z detector (FIG. 11D) permits the scanner to be operated at a frequency, determined by the topographical fluctuations of the sample, which is greater than the resonant frequency in the z direction.

Optical Viewing Assembly

Figure 12:
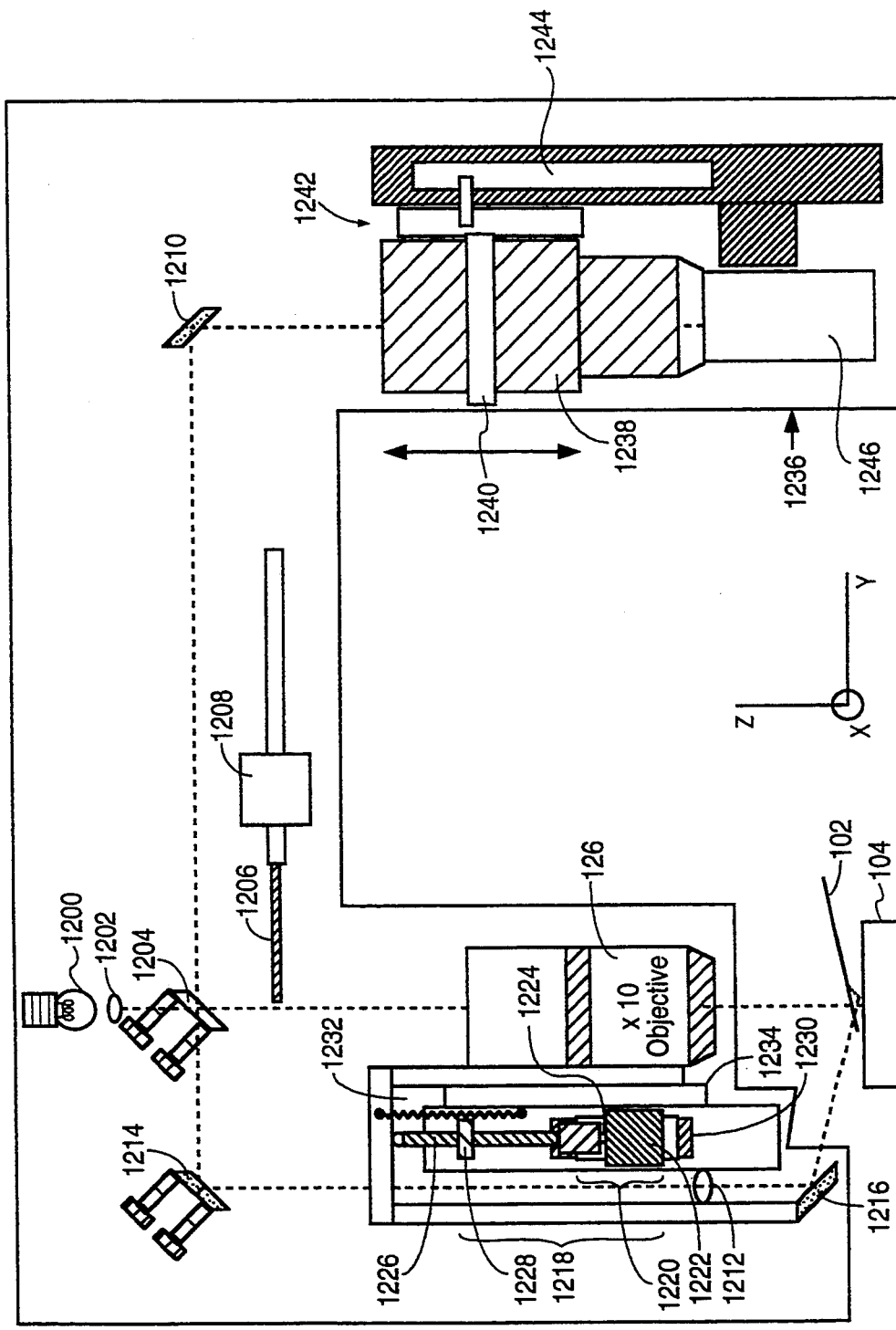
FIG. 12 illustrates the two optical paths.

FIG. 12 shows the optical viewing system for obtaining an optical view of the probe and sample and also of the deflection sensor positioning. One advantage of this structure is the oblique view of the sample, used principally for lowering the probe tip to the sample. It also permits monitoring of the cantilever tilt with respect to the sample. Additionally, an objective lens is positioned directly above the probe to give a coaxial (on-axis) view of the probe, the sample, and the laser spot on the back of the cantilever. This combination of the on-axis and oblique view is highly advantageous.

A further advantage of the structure of FIG. 12 results from the use of a conventional motorized zoom lens and its motor encoder to automatically control the image magnification and field size. After this motorized zoom lens is calibrated, it is advantageously possible to obtain both optical and scanning force microscopy images of the sample and accurately correlate features in the two images.

Light from an incandescent bulb 1200 (which is low power/wattage, to minimize thermal heating effects which could cause drift in the system) is condensed by planar convex lens 1202 (which is large enough for proper illumination of the objective aperture) and split by conventional beam splitter 1204. A shutter 1206 is aligned to block the path of light through either an on-axis objective lens 126 or an oblique achromat lens 1212. (Lens 1212 is a two-element lens to eliminate optical distortions.) Lens 1212 may also be an objective lens. Shutter 1206 is translated by conventional linear motor 1208 to block either light path. For on-axis viewing, light passes through objective lens 126 and is reflected from the back of the cantilever 102 and/or the sample 104. This reflected light follows a path from the beam splitter 1204 to mirror 1210 and down into the conventional camera motorized zoom lens 1238 (purchased from Minolta). The image of the probe and/or the sample is then detected by a conventional CCD camera 1246 for output to, for example, a video display (not shown). For oblique viewing, the shutter 1206 is moved so as to block the light's path through the objective lens 126. The light reflects from beam splitter 1204 and mirror 1214, and passes down through achromat lens 1212. The light then reflects from mirror 1216 onto the probe and/or the sample and is then reflected back along this same path. The oblique image can then be displayed on-screen in a like manner to the on-axis image.

The optical system is parfocal, such that the achromat and objective lenses share the same focal plane and such that the focal plane is not affected by the zoom-lens magnification. The advantage here is the ability to change image magnification and still maintain image focus. The objective lens 126 provides, for instance, additional X10, X20, or X50 image magnification for the coaxial view and may consist of two or three such lenses mounted on a rotating turret (not shown) so that the magnification can be adjusted in large steps. The entire optical viewing assembly is rigidly mounted to the base 114. Conventional kinematic mounts (not shown) for the beam splitter 1204 and the mirror 1214 allow the position of each view to be adjusted independently in roughly orthogonal directions so as to center the fields of view of either properly on the CCD camera 1246.

A motor assembly 1220 raises or lowers the objective lens assembly 1218 to move the sample 104 into the focal point of either lens. (They share the same focal plane). A conventional stepper motor 1222 is mounted on a vertical slide rail 1230. The motor shaft 1224 is coupled to a pushing screw 1226 which passes through fixed nut 1228 attached to the base 114. A ball tip on the screw 1226 forms the loading point for the objective lens assembly. When the motor 1222 turns, the pushing screw 1226 either raises or lowers the objective lens assembly 1218. Motor limit switches (not shown) located above and below motor 1222 define its range of motion along vertical slide rail 1230. The objective lens assembly 1218 is also mounted on a vertical slide rail 1234 to reduce torque. The achromat lens 1212 and mirror 1216 are mounted on assembly 1218 along with the objective lens and can likewise be raised/lowered by the motor 1222. Also, oblique and coaxial views share the same focal plane.

The motorized zoom and CCD camera assembly 1236 allow automatic image magnification of both a coaxial and an oblique view. The CCD camera 1246 is mounted rigidly to the base 114. A collar 1240 fits around the motorized zoom lens 1238 and is clamped to a vertical slide rail 1242 which in turn is fixed to the base 114. When the motorized zoom 1238 DC servo motor (not shown) is activated, the motorized zoom assembly 1238 extends or contracts while sliding along the rail 1242. A linear potentiometer 1244 is attached to the motorized zoom lens 1238 and senses the position of the lens relative to the base so that, with proper calibration, it monitors image magnification and field size.

User Interface for the SPM

The Scanning Probe Microscope (SPM) disclosed herein includes a computer-based graphical user interface. The typical user uses two main programs to acquire and analyze data from the SPM. The first program (called PSI DATA ACQUISITION) is used to control the microscope and collect data. The second program (called PSI IMAGE PROCESSING AND ANALYSIS) provides data analysis, image processing, and presentation for print-out. Both programs operate under the commercially available Microsoft Windows™ operating system. The user conventionally adjusts various parameters by manipulating icons on the screen using a pointing device such as a mouse and/or keyboard.

Operating under a windows-like user interface environment is known in the SPM field. However, several novel features directed to screen layout and the underlying control processes are disclosed below.

PSI Data Acquisition Screen

The user controls several functions in the PSI Data Acquisition program, and interfaces with this program via (for the most part) one screen which operates under the Microsoft Windows operating system. Manipulating screen icons changes program variables, thereby changing the microscope operating conditions. This screen (or program) is divided into several subfunctions.

Figure 13:
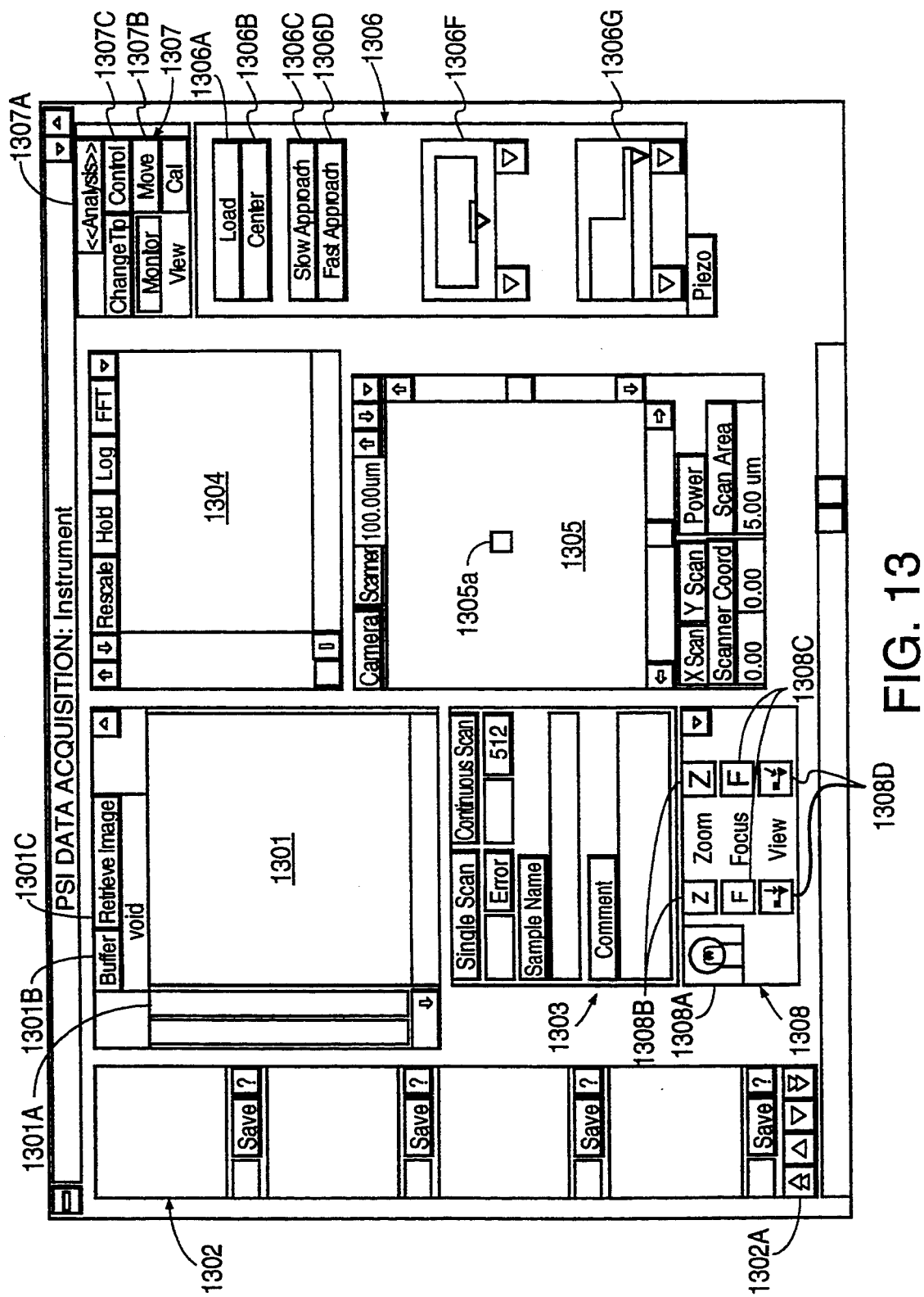
FIG. 13 illustrates the data acquisition user interface.

FIG. 13 shows the screen as the user first sees it. The screen itself has several versions, described below. Primary regions of the screen are labeled in FIG. 13. On the far left, a vertical column of buffer images 1302 is shown. Immediately to the right is the Active Window (AW) 1301. An image taken by the SPM will first appear in the AW 1301. To the right is a digital scope 1304 which shows the scan line trace in real time. Below the digital scope 1304 is the View 1305 used to locate a region for the next scan. Scan parameter buttons 1303 beneath the View 1305 are used to set scan parameters. FIG. 13 also shows the optical control buttons 1308 located beneath the AW window 1301. "Bulb" button 1308A is used to toggle the light source for the optical viewing assembly on or off. "Zoom" buttons 1308B control image magnification and field size using the motorized zoom assembly described earlier. "Focus" buttons 1308C are used to raise or lower the optical view assembly to bring an object into or out of the focal plane of the lens assembly. "View" buttons 1308D are used to switch between the coaxial and oblique views (i.e., they control positioning of the motorized shutter). The far top right of the screen contains several control buttons 1307 which control screen features. Below screen control buttons 1307 are motor control buttons 1306 for driving the above-described motorized x, y stage and the z stage.

Features of the PSI DATA ACQUISITION screen layout concern the buffer images 1302, the Active Window 1301, the live line trace provided by digital scope 1304, and the stage motor control processes which are activated using motor control buttons 1306 and the optical control buttons 1308.

Up to 16 buffered images at a time can be stored in the active (internal) memory of the computer. Four buffer images 1302 can be displayed at a time. The buffer scroll buttons 1302A allow the user to scroll through the column of images and display different images. The user may save any of these buffered images to a permanent storage device by using the mouse or other pointing device to click on the "Save" button below each image. If the user clicks on the "?" button alongside the "Save" button, the various parameters pertaining to that image are displayed (for instance experimental configuration and image processing parameters). These buffers allow the user to store data collected in real time in the computer's internal memory instead of in permanent storage. They also provide an on-screen record of data images for easy reference. The buffers 1302 can contain either newly generated images or images input from a database. The user can collect several scans from the same sample region and save only those needed, thereby making more efficient use of disk space.

Displaying buffered images on-screen is known. However, previously, the stack of images could not be ported (transferred) between the Data Acquisition and Image Processing programs. The buffered images were lost whenever a user exited data acquisition mode. The software disclosed herein instead automatically transfers the stack of buffers between the two programs. This portability lets the user perform image processing on data stored in a buffer to determine if an image will be worth saving to permanent storage. Image processing can now be performed on newly acquired images without first having to save them to a hard disk. This capability gives the user much greater flexibility during data acquisition.

The AW window 1301 and the transferred buffer images 1302 provide a constant point of reference as the user switches from the Data Acquisition Program to the Image Processing program. A contrast bias control 1301A appears to the left of AW 1301 and is used to adjust the grey scale of the image. (In a data image, variations in surface topography are conventionally represented using a grey scale.) The AW 1301 automatically displays the current data image, which can be either an optical view obtained using the optical viewing assembly (described above) or an SPM scan. A user can also import an image into the AW 1301 from a buffer 1302 by clicking on the "Buffer" button 1301B or can retrieve an image from a database using the "Retrieve Image" button 1301C. An image that is retrieved from a database is automatically loaded into a buffer. If all 16 buffers are full, the oldest buffered image is deleted.

The user jumps to the Image Processing program from the Data Acquisition program by clicking on the "Analysis" button 1307A at the top right of the screen shown in FIG. 13. The image in the AW 1301 and all 16 buffered images 1302, as well as their layout on the screen, are ported to the Image Processing program. Since the left-hand side of the screen appears the same to the user in both programs, the perceived complexity of the system is reduced. Although any prior art multitasking environment will permit data acquisition and image processing simultaneously, transferring both the buffered images and the active image between the two programs is advantageous over such prior art.

The buttons in scan parameter region 1303 are used conventionally to change the values of scan parameters such as the scan speed, scan direction, and scan size.

The digital scope 1304 displays the live line trace in the fast scan direction. (The scanner is raster-scanned in the x and y directions. In the fast scan direction, the computer collects continually a line a data for an image, made up of individual pixels. Movement in the slow scan direction positions the scanner for the next line of data.) It is very useful to see the live fast scan line trace, for instance to monitor the sensor output, (e.g., the feedback error signal) or surface topography or feedback error in real time. One prior art product displayed this live line trace using an analog oscilloscope (instead of a digital system). Prior art systems also use digital scopes. In the present system, the user can activate a digital scope by clicking the "Monitor" button of the screen control buttons 1307.

The present software also has capabilities not found in prior art digital scopes activated using the "Log" and the "FFT" buttons above the digital scope 1304. These buttons generate a display of the log of the feedback error signal and the 1-dimensional FFT (Fast Fourier Transform) of the data in real time, respectively. This is useful, for instance, in STM, where the tunneling current depends exponentially on the tip-to-sample spacing. Plotting the log of a signal is a useful capability, for instance in STM. Since the tunneling current depends exponentially on the tip distance from the sample, the logarithm of the error from an STM feedback loop will be linear with the z displacement between the tip and the sample and the user can easily obtain useful quantitative height information from the log plot. The FFT button activates display of the 1-dimensional FFT of the data in real time, which can be plotted as a function of time or space. This capability lets the user easily determine the spatial periodicity of a sample surface, since a peak in the FFT will occur at a frequency corresponding to this spatial periodicity. Additionally, any periodic noise sources will be visible as peaks in the FFT time plot. This display therefore provides a tool for diagnosing noise problems in the system, e.g. mechanical resonances can be filtered out in image processing. A further advantage of these features is that the user can now take quantitative measurements as a scan proceeds, thereby increasing throughput. The ability for the computer to analyze the scan data in real time has another advantage besides displaying it graphically to the user. The computer can analyze the scan data by some means (e.g., taking the log, or the FFT in the time domain, measure the height peak-to-peak, etc.) and then use the result of this analysis to change some system parameters so as to optimize the scanning conditions. For example, an FFT of the data in the frequency domain can indicate when a mechanical (or other type) of resonance in the system is beig excited by the existing scanning conditions. The computer (or controller) can measure this as a peak in the FFT and then change this parameter (e.g., slow the scan), to reduce its resonance. This use of some functional analysis of the data and then the interpretation of the results to optimize the scanning conditions is novel and advantageous.

View 1305 provides a method advantageously to import either an optical or an SPM image and use this image to assist in controlling the microscope. View 1305 provides the user with an easy-to-use, and accurate way to position the next scan automatically, in a particular region of the sample that has been located using either an optical view or the SPM. The user activates View 1305 by clicking on the "View" button of the screen control buttons 1307.

To bring in a previously taken SPM image from the AW 1301, the user clicks the "Scanner" button above the View 1305, which ports the image in the AW 1301 to the View 1305 box. By clicking the "Camera" button above the View 1305, the user can also load an image into View 1305 that has been taken optically using the CCD camera of the optical viewing assembly (described above). The user then locates a new scan region by selecting a feature or region of interest in this image. The user selects this region by positioning a cursor box 1305A around it. Conventionally, the dimensions of the cursor box 1305A can be varied and it can be moved around in the image by dragging the mouse or moving another pointing device. The user can also move around and zoom in on a particular portion of the image using scroll buttons. These zooming buttons and scroll bars are an additional advantage over one example of prior art software, which used only a cursor box. Also, these zooming techniques can now be applied to an optical image as well as an SPM scan. Furthermore computer algorithms including pattern recognition can be applied to images in either the Active Window 1301 or the View 1305 which either identify reference marks or otherwise analyze the image so as to permit automated selection and adjustment of the scanning parameter and location of the next scan region.

The cursor box 1305A defines the scan field, including the scan width and position, for the next scan. If the field of view is defined using an SPM image, the computer reads the position indicated by the cursor box 1305A and automatically moves the piezoelectric tube scanner (described above) to that region. If the chosen region is out of the range of the piezoelectric tube scanner (which is often the case when the region is defined using an image from the optical view), the computer automatically drives the x, y and the z coarse stages to position the sample for the scan. It is the configuration for the x, y and the z stages using stepper motors and limit switches that makes this View feature possible. The ability to accurately position the tube scanner is also important and depends directly on the present scan sensor arrangement. The computer is able continuously to track the motor position and thereby retain an accurate position calibration. As a result, the computer can determine the number of steps necessary to move the stepper motors for the next scan. With the View feature 1305, the user can start with a large field of view optical image and take scans that successively zoom in on a feature of interest until, for instance, the desired resolution is obtained. The capability of this system to let a user graphically define, using a mouse and/or cursors, a scan region in an optical view and then to position the SPM for this scan automatically is a substantial advantage.

Along the far right of the screen is the user interface for controlling the motorized x, y stage and the z stage. The stage motors are controlled using a column of motor control buttons 1306. The structure of these stages has been fully described above. The following describes the processes to control the stage motors which give this SPM system unique capabilities, by motorizing the three z approach screws. As described above, motorizing a z coarse stage is known. However, the following control processes relate to the motorization scheme.

The "load" button 1306A raises the probe head up to its upper limits and pushes the x,y stage out from under it for sample loading.

The "center" button 1306B pulls the x,y stage back under the head after the sample is loaded.

The "slow approach" 1306C performs a slow z approach until the deflection sensor registers contact between the probe and the surface of sample.

The "fast approach" 1306D performs a fast z approach until probe contact with the sample is registered.

The buttons to control the individual number of steps the motors travel are on a separate screen, activated by pressing the "Move" button at the top right.

Controlling the stage motors in accordance with the invention allows the system to determine the sample height and also to accurately adjust cantilever tilt and pitch while maintaining constant probe height above the sample. These modes of control become possible using a motor control method that enables the computer to keep track of motor position relative to a fixed zero position which is the same for all z motors.

Figure 14:
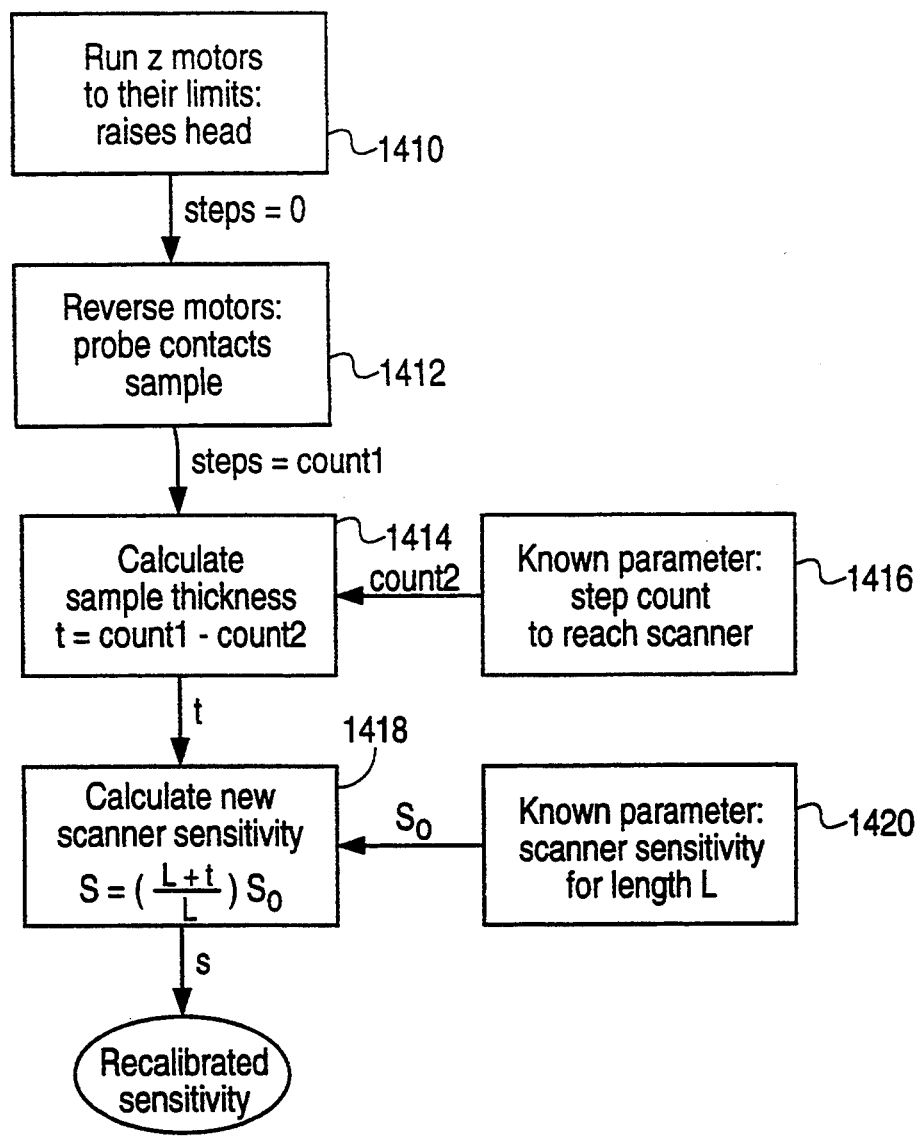
FIG. 14 illustrates the stage motor control process.

The sample height (see FIG. 14 showing flow chart) is determined in step 1410 by running the z stepper motors to their limit (at zero position) at which the probe head will be parallel to the sample surface. Correction factors may be applied for each system in order to compensate for manufacturing or other misalignments. Then in step 1412 the motors are reversed in unison while counting the number of steps taken to approach and contact the sample surface. The software in step 1414 automatically determines the sample height by calculating the number of steps to reach the top surface of the scanner less the number of steps to reach the top surface of the sample. In step 1416, the number of steps to reach the top surface of the scanner from the zero position for a scanner of known length L is known, and this value is supplied to step 1414. Then the sample height from step 1414 is supplied to step 1418 which uses this information to compute a new updated x, y sensitivity parameter for the piezoelectric tube scanner. The prior x, y sensitivity value of the scanner is provided from step 1420. (As described above, the x, y sensitivity is an important calibration parameter needed to accurately determine the lateral motion per unit applied bias the piezoelectric tube which depends on the sample height.)

In a separate process (see FIG. 13), the cantilever head is tilted using tilt buttons 1306F, which adjust the angle the cantilever chip makes with the sample surface.

Tilt is adjusted by driving the two z approach screws positioned at either side of the head the same number of steps in opposite directions. (These two approach screws are set towards the front of the x, y stage. Refer to FIG. 6C.) It is generally most desirable to have the cantilever chip oriented parallel to the surface. For instance, it avoids having a corner of the chip contact the surface. The computer adjusts the tilt so as to maintain the height of the cantilever above the sample. This task is not possible manually and is only possible under computer-control when the stepwise motion of the motors can be accurately monitored. The pitch buttons 1306G likewise adjust cantilever tilt, but in the perpendicular direction, as indicated by the graphic appearing above the buttons. The two front z approach screws are raised or lowered relative to the single rear z approach screw, so as to maintain constant cantilever height above the sample.

Clicking on the "Load" button 1306A runs all three z stepper motors back to their limits and drives the y stepper motor to its frontmost limit, thereby raising the head and pushing the x, y coarse stage out from under it. Sample loading therefore becomes a simple procedure. The capability of the system to determine the sample height and adjust cantilever tilt and pitch over the sample are advantageous features controlled in this portion of the screen.

After the stage is positioned for a scan, the user clicks on the "Control" button 1307C. The motor control buttons 1306 are then replaced by new icons (not shown) and buttons that conventionally control the feedback parameters.

Two additional advantages relate to computer control of the coaxial optical view. An optical control process automatically and quickly positions the probe to within a few microns of the same surface using the z coarse stage. This method permits fast movement of the coarse z stage until the probe is within a few microns of the sample surface by activating the "fast approach" button. Then the "slow approach" button slows the z stage to further lower the probe to within the range of the x, y, z fine stage. In addition, an optical control process automatically determines the slope of a sample surface, for instance when the sample is not mounted parallel to the x, y scan plane. Knowledge of the sample slope is used to correct the data image.

This computer control of the coaxial optical view is a significant advance over the prior art. Previously, the coarse z approach had to be monitored and controlled manually in order to avoid damaging the probe by crashing it into the surface. In contrast, the present system is fully automatic and significantly shortens the time required to position the probe over the sample. The following describes the underlying control processes of the present system.

As described above, to permit loading a new sample in the microscope, the three z stage motors are run simultaneously to their limits, thus raising the head its farthest above the sample. To begin a sample scan, the probe is then lowered to within a few microns of the surface, to within the range of the fine x, y, z stage (e.g., a piezoelectric tube scanner). Since a range of sample thicknesses can be accommodated, the probe must travel some distance (ranging from zero to about 25 mm) to reach the sample. To increase sample throughput, it is advantageous that this distance be traveled speedily. However, the z feedback controller and the z motion of the piezoelectric tube scanner have a finite response time. Even though probe contact with the sample will be registered by the deflection sensor in the head, the z approach screws may be driven too fast for the z feedback controller and the scanner to respond to this contact. In such a case, the probe can be damaged by "crashing" into the sample surface. It is therefore also advantageous to have the probe slow down a few microns above the sample, for final approach at a speed that is within the bandwidth of the z feedback control loop.

This is achieved by making use of the capability to move the focal plane of the coaxial objective lens under computer control. This process uses well-known software (prior art) to determine if an image is in focus.

Figure 15:
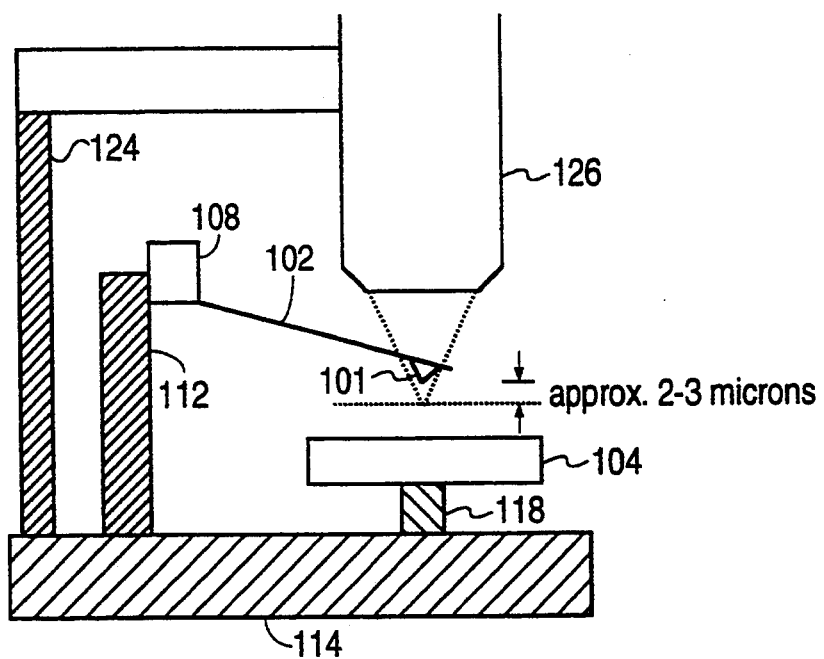
FIG. 15 illustrates the positioning of the optical focal plane below the probe.

As described above, the focal plane of both the coaxial view and the oblique view is adjusted under computer control by a motor mounted via a slide rail to the base 114. (See FIG. 15.) This motor raises and lowers the optical viewing assembly to bring an object into or out of this focal plane, which is common to both views. The optical control process presets the focal plane of the objective lens 126 a few microns below the plane of the probe 101. (This is achieved by focussing on the probe 101 and then stepping the motor so as to lower the focal plane below the plane of the probe a known amount.) The z stage and the objective lens assembly 124 are then lowered in unison. Probe 101 thus approaches the surface of sample 104 and the objective lens assembly 124 lowers so that its focal plane remains the same distance below the plane of the probe. This focal plane is then brought into coincidence with the sample 104. When it is determined conventionally that the image of the sample 104 surface is in focus, the probe will be a few microns (about 2 to 3 $\mu$m) above the surface. The speed of the z coarse stage is then reduced and the probe is brought to within the range of the tube scanner. This advantageously reduces the time it takes to approach a sample and avoids "crashing" the probe into the surface of the sample. Alternatively the optical focus is first located on the sample as described above, and then the probe is rapidly lowered to within a few microns of the sample surface.

A second advantage of computer control of the optical view is that the optical control process provides a means to automatically determine the slope of a sample surface relative to the x, y scan plane. Such a slope appears as a uniform tilt in the data image and is not considered meaningful topographical data. Knowledge of the sample surface slope is used to correct the data image. The prior art provides means for determining the sample slope and subtracting it form the image in either real time or through later image processing. Another use of the tilt information obtained from the optical view is to automatically calculate the tilt of the head (i.e., as described above) so as to bring the cantilever and chip towards the sample surface without the surface hitting the chip.

In accordance with the present invention, however, the coaxial optical view is used advantageously to determine the height of the sample at three different locations. The control process counts the number of motor steps required to bring the sample plane into focus at these three locations. These data are used to calculate the slope of the sample, which can be entered into the x, y and z feedback control loops as a preset parameter, thereby alleviating the need for any real time or post-imaging slope correction.

PSI Image Processing and Analysis Screens

Figure 16:
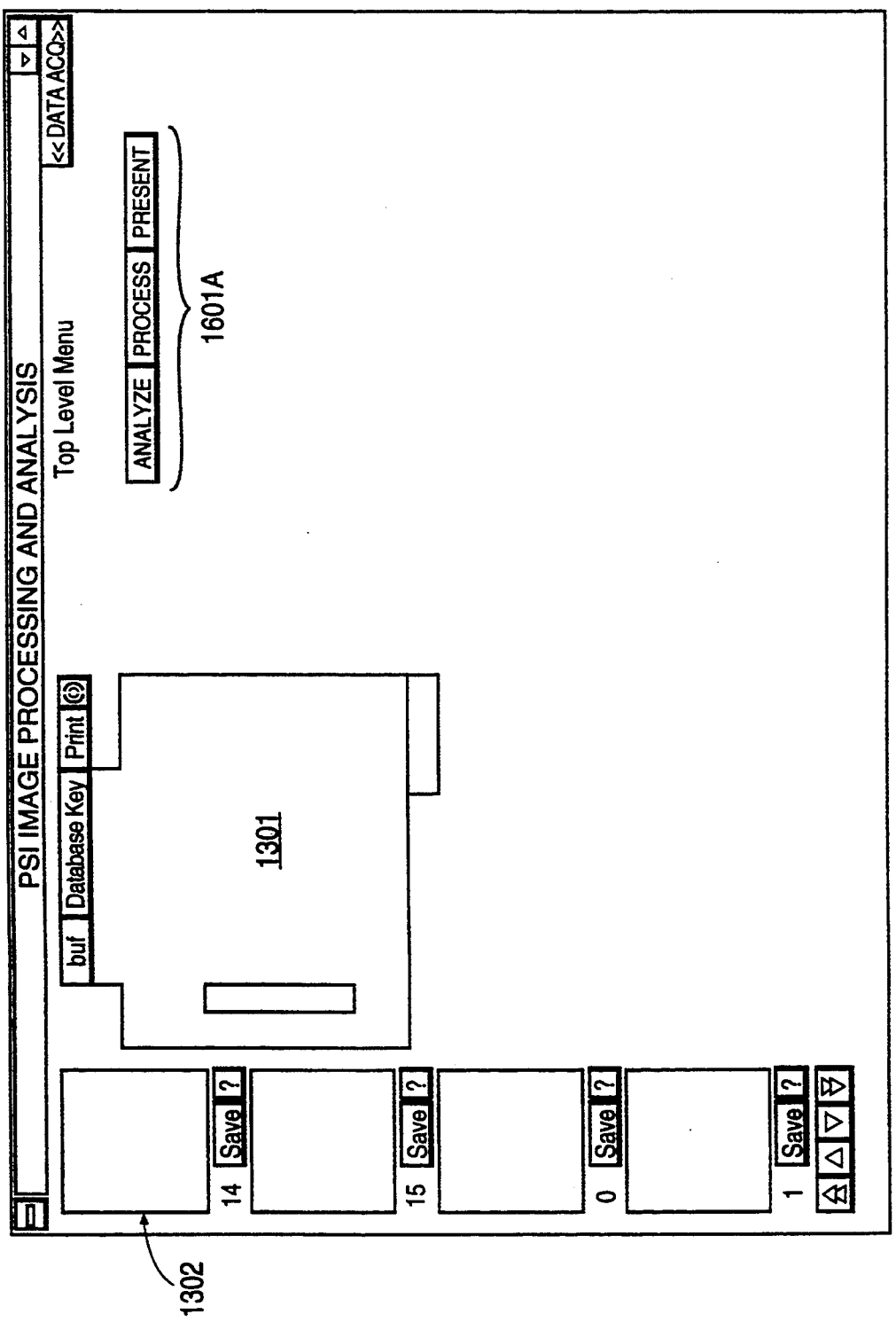

Clicking on the "Analysis" button 1307A in the PSI DATA ACQUISITION screen shown in FIG. 13 transfers program control to the PSI IMAGE PROCESSING AND ANALYSIS screen. As described above, the AW 1301 and all the buffers 1302 are ported to this program. FIG. 16 shows the PSI IMAGE PROCESSING AND ANALYSIS screen as the user first sees it. The Image Processing and Analysis program has three image manipulation modes, entered by clicking on one of the image manipulation mode buttons 1601A. The user enters Analysis mode by clicking the "analysis" button. Analysis mode is used to generate useful quantitative information from the data, for instance, measurements of sample roughness or periodicity. Process mode, entered by clicking the "process" button, allows the user to do image processing, such as removing noise from an image or cropping an image. Present mode, entered by clicking the button "present" of the image manipulation mode buttons 1601A, sets up an image or images for printout in a desired format, for instance in a multi-image format with comment fields for each image, or in a 3-D rendered version.

There are several different PSI IMAGE PROCESSING AND ANALYSIS screens, depending on which sub-program the user enters. The Analysis sub-program screens provide a 1-dimensional FFT with variable high and low pass filters which are adjusted using a mouse, and also a 2-dimensional FFT which first operates on a reduced data set for increased processing speed. The sub-program called Present screens use a graphic icon to show the effect of varying 3-dimensional rendering parameters, such as the position of an artificial light source.

Figure 17:
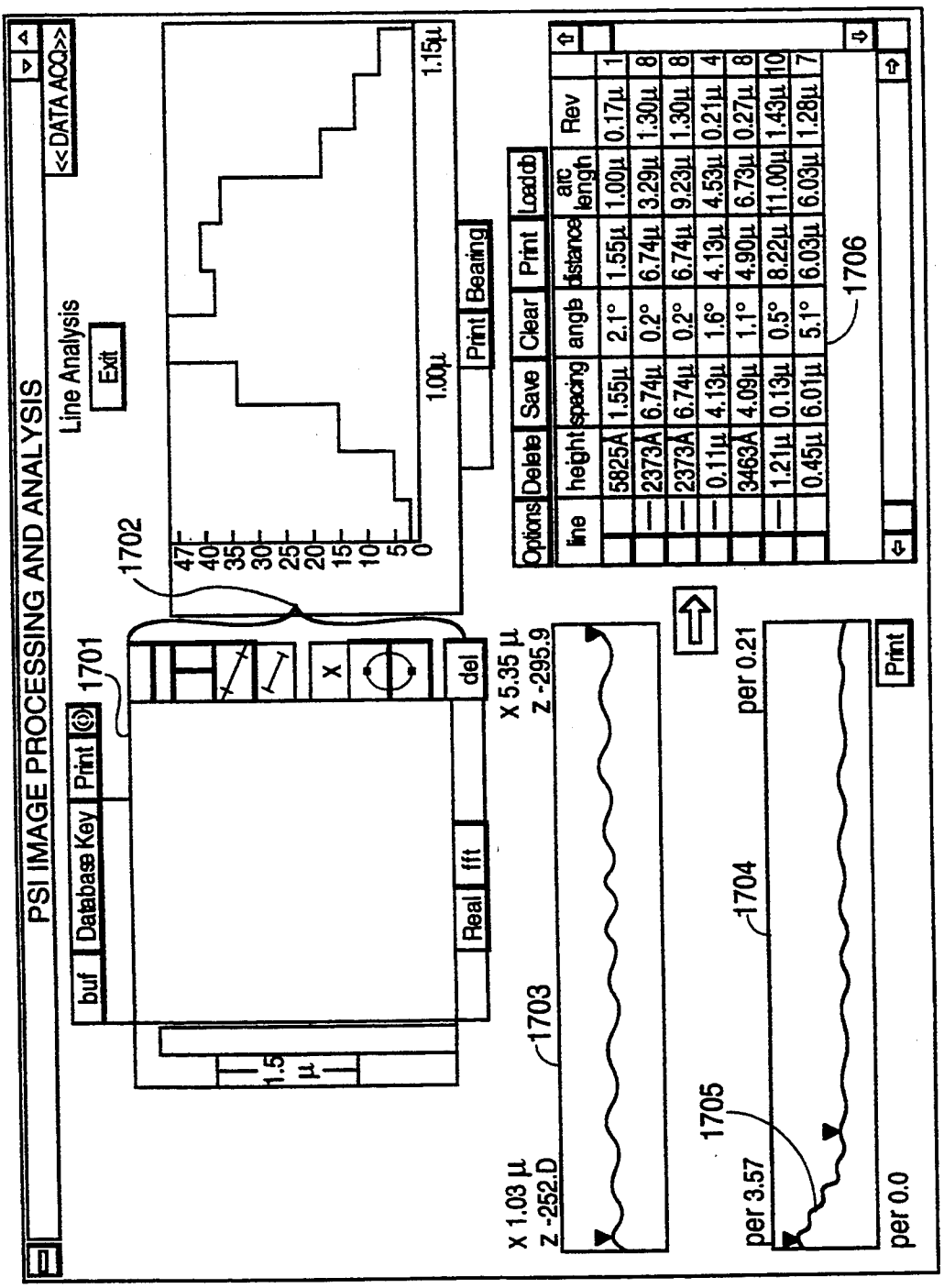

FIG. 17 shows the screen as the user sees it after entering the Line analysis mode of the Analysis sub-program. The AW 1701 is shown, displaying the line analysis of the image it contains. There are two important differences between the 1-dimensional FFT 1704 here and the 1-dimensional FFT of the digital scope 1304 in the Data Acquisition program. Since the digital scope 1704 shows the live line trace, the FFT can only be performed in the fast scan direction. In Line Analysis mode, however, the user can choose any arbitrary line, including a short segment, on which to perform a 1-dimensional FFT. This gives the user greater flexibility for data analysis since, for instance, periodicities in directions other than the scan direction can be examined. The second difference concerns a variable band-pass filter.

The user can choose a line of data to analyze in several ways. The line style and placement of the end points are chosen using the line choice buttons 1702 to the right of the AW 7101. The chosen line (essentially the plot of the z intensity along the line) is displayed in unfiltered line box 1703 below the AW, and the 1-dimensional FFT of this line is automatically displayed in filtered line box 1704. The user can choose to have specific aspects of the line computed and automatically displayed in tabular form in table 1706. These quantitative measurements can include, for instance, surface roughness and peak-to-peak height. The user may choose more than one line at a time.

The user can filter the line display in box 1703 to reveal or eliminate various periodicities by adjusting the values of a band pass filter. The values of the filter are indicated by the position of cursor arrows 1705 for filtering, which point to the filtered line in the filtered line box 1704. The left-most arrow 1705 is a high pass filter and the right-most arrow 1705 is a low pass filter. The user adjusts the position of cursors 1705 by clicking on them and dragging them along the line using the mouse. Moving cursors 1705 eliminates various frequency components from the filtered line box 2304.

The filters indicated by cursor arrows 1705 are used to eliminate one of the spectral peaks of the FFT. When the cursor arrows 1705 are moved, the computer calculates the reverse FFT in real time and this is displayed in the window. The user can therefore see the effect of the filtering immediately. This filtering uses cursors 1705 to adjust the filtering parameters and which displays the results of the calculation in real time, in both a graphical display and a tabular format, making line analysis intuitive and easy to use.

In Filtering mode (see FIG. 17), the user can use a 2-dimensional filter to take the 2-dimensional FFT of an image. The values of the high and low pass filters for both the x and y directions can be changed by either typing in new values or using scroll bars. This software advantageously calculates the 2-dimensional FFT using a reduced data set such as a neighborhood of contiguous pixels. By using one quarter of the image, for instance, the calculation proceeds much faster. After the user has optimized filtering parameters, these can then be applied to the entire data image.

Figure 18:
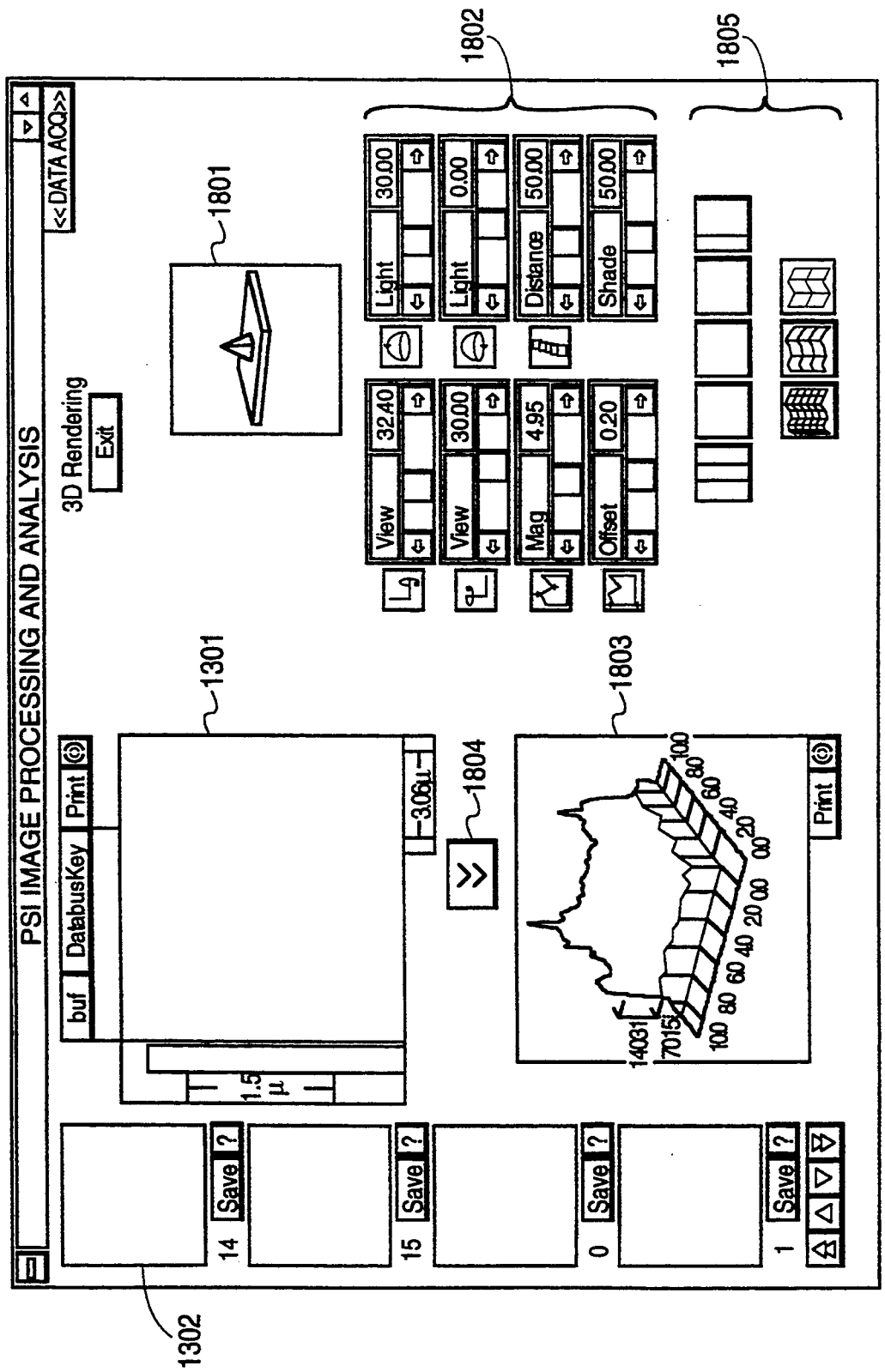

FIG. 18 shows the 3-dimensional Rendering screen. The primary feature shown is use of a graphic to show the effect of varying 3-dimensional rendering parameters such as the position of an artificial light source. This screen displays the buffered images 1302 and the AW 1301. Whichever image is brought into the AW 1301 will be the one rendered in a 3-dimensional perspective in region 1803. This operation involves positioning an artificial light source and varying the viewing angle of the image, among other variables, to enhance edge perspective and create the illusion of a 3-dimensional perspective of the surface.

Although the prior art lets the user vary these 3-dimensional rendering parameters, the prior art process of optimizing them to create the best 3-dimensional rendering is tedious and non-intuitive. In the prior art, the user must choose numerical values for these parameters. The computer then calculates and draws the resulting image, a process which takes several seconds. The user then decides if another iteration is necessary.

FIG. 18 shows the present method for varying these parameters. The software uses a dedicated graphic 1801 to show the user in real time the effect of varying these 3-dimensional rendering parameters, and lets the user optimize these parameters visually before applying them to the data image. The iteration process required to generate the final image is now significantly shorter. In addition, since the perspective view of the graphic changes in real time, the user can immediately see the effect of changing a parameter. The process is therefore much more intuitive and no longer requires dealing with numerical values. Any suitable graphic can be used for this purpose, including a portion of the real data image (for instance, a piece of the image with lower resolution, with fewer scan lines or pixels drawn for faster computation times).

The graphic 1801 is an artificial structure having simple geometries, hence greatly speeding computation and drawing time. The user changes the 3-dimensional rendering parameters using the 3-D parameter scroll bars 1802. The perspective view of graphic 1801 is updated in real time to show the effect of changing each parameter. When satisfied with this view 1801, the user clicks on the done button 1804, thereby applying these optimized parameters to the real data image displayed in the AW 1301. This image rendered in a 3-dimensional perspective is shown in 3-D image box 1803. The user can change the resolution of the final image and the color display by clicking on the resolution and color buttons 1805 at the bottom right of the screen.

It is to be understood that implementation of the above-described screen images and control methods may be achieved in many different ways in terms of computer programming, and implementation of such computer programs is well within the abilities of one of ordinary skill in the art, given the above description.

The above disclosure is illustrative and not limiting; further modifications will be apparent to one of ordinary skill in the art in light of this disclosure and the appended claims.

We claim:

1. A microscope for providing both an oblique and an on-axis view of a sample, comprising:
    a light source for providing light along an axis;
    a support for supporting the sample;
    a viewing device located to receive an on-axis view of the sample when the sample is on the support;
    a reflector located adjacent to the support for providing to the viewing device a view of the sample obliquely relative to the axis; and
    a shutter for alternatively interrupting the on-axis view or the oblique view from the reflector from reaching the viewing device,
   wherein the on-axis view is focused and magnified onto the viewing device by a first lens movable along the axis, and the oblique view is focused and magnified onto the viewing device by a second lens movable along a second axis, wherein the oblique view is provided along the second axis.

2. The microscope of claim 1, further comprising:
    a scanning probe microscope having a display;
    means for displaying a scanning probe image on the display; and
    means for displaying an image from the viewing device on the display.

3. A microscope for providing both an oblique and an on-axis view of a sample, comprising:
    a light source for providing light along an axis;
    a support for supporting the sample;
    a viewing device located to receive an on-axis view of the sample when the sample is on the support;
    a reflector located adjacent to the support for providing to the viewing device a view of the sample obliquely relative to the axis; and
    a shutter for alternatively interrupting the on-axis view or the oblique view from the reflector from reaching the viewing device,
   wherein the on-axis view is focused and magnified onto the viewing device by a first lens moveable along the axis, and the oblique view is focused and magnified onto the viewing device by a second lens moveable along a second axis, wherein the oblique view is provided along the second axis, and
   wherein each of said first and second lenses is moveable along its respective axis under motor control.

4. The microscope of claim 3, further comprising:
    a scanning probe microscope having a display;
    means for displaying a scanning probe image on the display; and
    means for displaying an image from the viewing device on the display.

5. A microscope for providing both an oblique and an on-axis view of a sample, comprising:
    a light source for providing light along an axis;
    a support for supporting the sample;
    a viewing device located to receive an on-axis view of the sample when the sample is on the support;
    a reflector located adjacent to the support for providing to the viewing device a view of the sample obliquely relative to the axis;
    a shutter for alternatively interrupting the on-axis view or the oblique view from the reflector from reaching the viewing device;
    a first and a second movable lens for respectively focussing the on-axis view and the oblique view onto the viewing device; and
    a motor control for moving the first and second lenses.

6. The microscope of claim 5, further comprising:
    a scanning probe microscope having a display;
    means for displaying a scanning probe image on the display; and
    means for displaying an image from the viewing device on the display, 7. A microscope for providing both an oblique and an on-axis view of a sample comprising:
    a light source for providing light along an axis;
    a support for supporting the sample;
    a viewing device located to receive an on-axis view of the sample when the sample is on the support;
    a reflector located adjacent to the support for providing to the viewing device a view of the sample obliquely relative to the axis; and
    a shutter for alternatively interrupting the on-axis view or the oblique view from the reflector from reaching the viewing device,
   wherein the on-axis view is focused and magnified onto the viewing device by a first lens moveable along the axis, and the oblique view is focused and magnified onto the viewing device by a second lens moveable along a second axis, wherein the oblique view is provided along the second axis,
   wherein the first and second lenses move together and have the same focal plane.

8. The microscope of claim 7, further comprising:
    a scanning probe microscope having a display;
    means for displaying a scanning probe image on the display; and
    means for displaying an image from the viewing device on the display.

* * * * *